United States Patent
Wengerter

(10) Patent No.: US 10,959,256 B2
(45) Date of Patent: *Mar. 23, 2021

(54) CONTROL CHANNEL SIGNALING FOR INDICATING THE SCHEDULING MODE

(71) Applicant: Panasonic Intellectual Property Corporation of America, Torrance, CA (US)

(72) Inventor: Christian Wengerter, Kleinheubach (DE)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/665,812

(22) Filed: Oct. 28, 2019

(65) Prior Publication Data

US 2020/0059948 A1    Feb. 20, 2020

Related U.S. Application Data

(63) Continuation of application No. 16/355,154, filed on Mar. 15, 2019, now Pat. No. 10,499,417, which is a (Continued)

(30) Foreign Application Priority Data

Jan. 5, 2008 (EP) .................................... 08000138

(51) Int. Cl.
*H04W 72/12* (2009.01)
*H04W 72/04* (2009.01)
(Continued)

(52) U.S. Cl.
CPC ....... *H04W 72/1278* (2013.01); *H04L 1/0027* (2013.01); *H04L 1/0028* (2013.01);
(Continued)

(58) Field of Classification Search
CPC ......... H04W 72/1278; H04W 72/0413; H04W 72/042; H04W 72/0446; H04L 1/0027;
(Continued)

(56) References Cited

U.S. PATENT DOCUMENTS 8,004,977 B2 *  8/2011  Vitebsky ............... H04L 47/745
                                                 370/230
9,264,207 B2 *  2/2016  Wengerter ............ H04L 1/0027
(Continued)

FOREIGN PATENT DOCUMENTS

CN      101026431 A      8/2007
EP      1 855 424 A1    11/2007
(Continued)

OTHER PUBLICATIONS

"3rd Generation Partnership Project; Technical Specification Group Radio Access Network; Physical layer aspects for evolved Universal Terrestrial Radio Access (UTRA) (Release 7)," 3GPP TR 25.814 V7.1.0, Sep. 2006, 132 pages.
(Continued)

*Primary Examiner* — Christopher M Crutchfield
*Assistant Examiner* — Tito Q Pham
(74) *Attorney, Agent, or Firm* — Seed IP Law Group LLP

(57) ABSTRACT

The invention relates to a control channel signal for use in a mobile communication system providing at least two different scheduling modes. Further the invention relates to a scheduling unit for generating the control channel signal and a base station comprising the scheduling unit. The invention also relates to the operation of a mobile station and a base station for implementing a scheduling mode using the control channel signal. In order to facilitate the use of different scheduling schemes for user data transmission while avoiding an additional flag for indicating the scheduling mode in the control signaling, the invention proposes
(Continued)

the use of code points in existing control channel signal fields. Further, the invention proposes a specific scheduling mode for use in combination with the proposed control channel signal. According to this scheduling mode control channel information is only provided for retransmissions, while initial transmissions are decoded using blind detection.

12 Claims, 9 Drawing Sheets

Related U.S. Application Data continuation of application No. 15/712,014, filed on Sep. 21, 2017, now Pat. No. 10,278,205, which is a continuation of application No. 15/284,259, filed on Oct. 3, 2016, now Pat. No. 9,807,788, which is a continuation of application No. 14/987,454, filed on Jan. 4, 2016, now Pat. No. 9,485,782, which is a continuation of application No. 12/811,512, filed as application No. PCT/EP2008/009738 on Nov. 18, 2008, now Pat. No. 9,264,207.

(51) Int. Cl.
 *H04L 1/00* (2006.01)
 *H04L 1/18* (2006.01)
 *H04L 5/00* (2006.01)
(52) U.S. Cl.
 CPC .......... *H04L 1/1896* (2013.01); *H04L 5/0003* (2013.01); *H04L 5/0014* (2013.01); *H04L 5/0037* (2013.01); *H04L 5/0094* (2013.01); *H04W 72/042* (2013.01); *H04W 72/0413* (2013.01); *H04W 72/0446* (2013.01); *H04L 1/0038* (2013.01); *H04L 1/1867* (2013.01)
(58) Field of Classification Search
 CPC ..... H04L 1/0028; H04L 5/003; H04L 5/0014; H04L 5/0037; H04L 5/0094; H04L 1/0038; H04L 1/1867
 See application file for complete search history.

(56) References Cited

U.S. PATENT DOCUMENTS

| | | | |
|---|---|---|---|
| 9,485,782 B2* | 11/2016 | Wengerter | H04W 72/0446 |
| 9,807,788 B2* | 10/2017 | Wengerter | H04L 1/1896 |
| 10,278,205 B2* | 4/2019 | Wengerter | H04L 1/0027 |
| 10,499,417 B2* | 12/2019 | Wengerter | H04W 72/0446 |
| 2003/0147371 A1 | 8/2003 | Choi et al. | |
| 2004/0266461 A1 | 12/2004 | Beckmann et al. | |
| 2009/0103482 A1 | 4/2009 | Imamura et al. | |
| 2009/0138598 A1 | 5/2009 | Shrivastava et al. | |
| 2009/0262699 A1 | 10/2009 | Wengerter et al. | |
| 2010/0248765 A1 | 9/2010 | Chun et al. | |
| 2010/0309870 A1 | 12/2010 | Wengerter et al. | |
| 2011/0188432 A1* | 8/2011 | Yin | H04W 28/06 370/311 |

FOREIGN PATENT DOCUMENTS

| | | |
|---|---|---|
| EP | 2 073 419 A1 | 6/2009 |
| RU | 2 307 467 C2 | 9/2007 |
| WO | 2004/017541 A1 | 2/2004 |

OTHER PUBLICATIONS

"3rd Generation Partnership Project; Technical Specification Group Radio Access Network; High Speed Downlink Packet Access (HSDPA); Overall description; Stage 2 (Release 7)," 3GPP TS 25.308 V7.4.0, Sep. 2007, 50 pages.
"3rd Generation Partnership Project; Technical Specification Group Radio Access Network; Continuous connectivity for packet data users (Release 7)," 3GPP TR 25.903 V7.0.0, 2007, 90 pages.
Communication Pursuant to Article 94(3) EPC dated Jan. 3, 2013, for corresponding EP Application No. 08870446.5, 8 pages.
English Translation of Notice of Preliminary Rejected, dated Mar. 2, 2017, for corresponding Korean Patent Application No. 2016-7036103, 9 pages.
English Translation of Text of the First Office Action and Search Report, dated Feb. 27, 2017, for corresponding Chinese Application No. 201410487540.7, 8 pages.
European Search Report relating to European Patent Application No. 08 00 0138, dated Sep. 5, 2008, 1 page.
Ericsson, "E-UTRAN Random Access procedure C-RNTI assignment and HARQ on message 4 with RACH model," Tdoc R2-070365, 3GPP TSG-RAN WG2 #56bis, Agenda Item: 5.2.2, Sorrento, Italy, Jan. 15-19, 2007, 4 pages.
Ericsson, "Notes from offline discussions on PDCCH contetns," R1-073870, Agenda Item: 7.2.3, TSG-RAN WG1 #50, Athens, Greece, Aug. 20-24, 2007, 3 pages.
Extended European Search Report, dated Mar. 6, 2019, for corresponding European Application No. 18208450.9-1214, 10 pages.
Indian Office Action, dated Aug. 31, 2017, for corresponding Indian Application No. 2373/KOLNP/2010, 8 pages.
Motorola, "Scheduling for downlink," R2-070758, Agenda Item: 11.2.1, 3GPP TSG-RAN-WG2#57, St. Louis, USA, Feb. 12-16, 2007, 3 pages.
Motorola, "Downlink Resource Allocation Mapping for E-UTRA," R1-074582, RAN WG1#51, Jeju, Korea, Nov. 5-9, 2007, 13 pages.
NEC Group, "DL Multiplexing for Persistent and Dynamic scheduling," R1-073460, TSG-RAN WG1#50, Agenda Item: 7.2.3, Athens, Greece, Aug. 20-24, 2007, 3 pages.
NEC Group, "DL Multiplexing for Persistent and Dynamic scheduling," R1-074717, TSG-RAN WG1 #51, Agenda Item: 6.2.3, Jeju, South Korea, Nov. 5-9, 2007, 3 pages.
Nokia Corporation, Nokia Siemens Networks, "Presistent scheduling for DL," R2-080018, R2-074680, 3GPP TSG-RAN WG2 Meeting #60bis, Agenda Item: 4.3.3, Sevilla, Spain, Jan. 14-18, 2008, 5 pages.
Nokia Corporation, Nokia Siemens Networks, "Signaling of persistent allocation on PDCCH," R1-080299, 3GPP TSG-RAN WG1 Meeting #51bis, Agenda Item: 6.1.3, Sevilla, Spain, Jan. 14-18, 2008, 3 pages.
Notice of Preliminary Rejection dated Dec. 2, 2014, for corresponding KR Application No. 2010-7017463, 10 pages.
NTT DoCoMo, Inc., "Signalling optimized DL scheduling for LTE," R2-070272, Agenda Item: 5.2.3, 3GPP TSG-RAN WG2 Meeting #56bis, Sorrento, Italy, Jan. 15-19, 2007, 4 pages.
NTT DoCoMo, Ericsson, Fujitsu, Mitsubishi Electric, NEC, Panasonic, Sharp, Toshiba Corporation, "Comparison between RB-level and Sub-carrier-level Distributed Transmission for Shared Data Channel in E-UTRA Downlink," R1-062089 (Original R1-061182), Agenda Item: 8.2, 3GPP TSG RAN WG1 #46, Tallinn, Estonia, Aug. 28-Sep. 1, 2006, 14 pages.
Panasonic, "PDCCH Signaling for retransmission of downlink persistent scheduling," R1-074912, 3GPP TSG-RAN WG1 Meeting #51, Agenda Item: 6.2.3, Jeju Korea, Nov. 5-9, 2007, 3 pages.
Panasonic, "VoIP System Performance for E-UTRA Downlink— Additional Results," R1-062179, Agenda Item: 8.7.1, 3GPP TSG-RAN WG1 Meeting #46, Tallinn, Estonia, Aug. 28-Sep. 1, 2006, 7 pages.
Russian Decision on Grant dated Jun. 23, 2014, for corresponding RU Application No. 2013104552/07(006805), and English translation thereof, 12 pages.
Toskala et al., "High-speed Downlink Packet Access," in Harri Holma and Antti Toskala (eds.), WCDMA for UMTS—Radio Access for Third Generation Mobile Communications, Third Edition, John Wiley & Sons, Ltd., 2004, chapters 11.1 to 11.5, pp. 307-319. (25 pages).

* cited by examiner

CONTROL CHANNEL SIGNALING FOR INDICATING THE SCHEDULING MODE

FIELD OF THE INVENTION

The invention relates to a control channel signal for use in a mobile communication system providing at least two different scheduling modes. Further, the invention relates to a scheduling unit for generating the control channel signal and a base station comprising the scheduling unit. The invention also relates to the operation of a mobile station and a base station for implementing a scheduling mode using the control channel signal proposed by the invention.

TECHNICAL BACKGROUND

Packet-Scheduling and Shared Channel Transmission

In wireless communication systems employing packet-scheduling, at least part of the air-interface resources are assigned dynamically to different users (mobile stations—MS or user equipments—UE). Those dynamically allocated resources are typically mapped to at least one Physical Uplink or Downlink Shared CHannel (PUSCH or PDSCH). A PUSCH or PDSCH may for example have one of the following configurations:

- One or multiple codes in a CDMA (Code Division Multiple Access) system are dynamically shared between multiple MS.
- One or multiple subcarriers (subbands) in an OFDMA (Orthogonal Frequency Division Multiple Access) system are dynamically shared between multiple MS.
- Combinations of the above in an OFCDMA (Orthogonal Frequency Code Division Multiplex Access) or a MC-CDMA (Multi Carrier-Code Division Multiple Access) system are dynamically shared between multiple MS.

FIG. 1 shows a packet-scheduling system on a shared channel for systems with a single shared data channel. A sub-frame (also referred to as a time slot) reflects the smallest interval at which the scheduler (e.g., the Physical Layer or MAC Layer Scheduler) performs the dynamic resource allocation (DRA). In FIG. 1, a TTI (transmission time interval) equal to one sub-frame is assumed. It should be born noted that generally a TTI may also span over multiple sub-frames.

Further, the smallest unit of radio resources (also referred to as a resource block or resource unit), which can be allocated in OFDM systems, is typically defined by one sub-frame in time domain and by one subcarrier/subband in the frequency domain. Similarly, in a CDMA system this smallest unit of radio resources is defined by a sub-frame in the time domain and a code in the code domain.

In OFCDMA or MC-CDMA systems, this smallest unit is defined by one sub-frame in time domain, by one subcarrier/subband in the frequency domain and one code in the code domain. Note that dynamic resource allocation may be performed in time domain and in code/frequency domain.

The main benefits of packet-scheduling are the multi-user diversity gain by time domain scheduling (TDS) and dynamic user rate adaptation.

Assuming that the channel conditions of the users change over time due to fast (and slow) fading, at a given time instant the scheduler can assign available resources (codes in case of CDMA, subcarriers/subbands in case of OFDMA) to users having good channel conditions in time domain scheduling.

Specifics of DRA and Shared Channel Transmission in OFDMA

Additionally to exploiting multi-user diversity in time domain by Time Domain Scheduling (TDS), in OFDMA multi-user diversity can also be exploited in frequency domain by Frequency Domain Scheduling (FDS). This is because the OFDM signal is in frequency domain constructed out of multiple narrowband subcarriers (typically grouped into subbands), which can be assigned dynamically to different users. By this, the frequency selective channel properties due to multi-path propagation can be exploited to schedule users on frequencies (subcarriers/subbands) on which they have a good channel quality (multi-user diversity in frequency domain).

For practical reasons in an OFDMA system the bandwidth is divided into multiple subbands, which consist out of multiple subcarriers. I.e., the smallest unit on which a user may be allocated would have a bandwidth of one subband and a duration of one slot or one sub-frame (which may correspond to one or multiple OFDM symbols), which is denoted as a resource block (RB). Typically, a subband consists of consecutive subcarriers. However, in some case it is desired to form a subband out of distributed non-consecutive subcarriers. A scheduler may also allocate a user over multiple consecutive or non-consecutive subbands and/or sub-frames.

For the 3GPP Long Term Evolution (3GPP TR 25.814: "Physical Layer Aspects for Evolved UTRA", Release 7, v. 7.1.0, October 2006—available at http://www.3gpp.org and incorporated herein by reference), a 10 MHz system (normal cyclic prefix) may consist out of 600 subcarriers with a subcarrier spacing of 15 kHz. The 600 subcarriers may then be grouped into 50 subbands (a 12 adjacent subcarriers), each subband occupying a bandwidth of 180 kHz. Assuming, that a slot has a duration of 0.5 ms, a resource block (RB) spans over 180 kHz and 0.5 ms according to this example.

In order to exploit multi-user diversity and to achieve scheduling gain in frequency domain, the data for a given user should be allocated on resource blocks on which the users have a good channel condition. Typically, those resource blocks are close to each other and therefore, this transmission mode is in also denoted as localized mode (LM).

An example for a localized mode channel structure is shown in FIG. 2. In this example neighboring resource blocks are assigned to four mobile stations (MS1 to MS4) in the time domain and frequency domain. Each resource block consists of a portion for carrying Layer 1 and/or Layer 2 control signaling (L1/L2 control signaling) and a portion carrying the user data for the mobile stations.

Alternatively, the users may be allocated in a distributed mode (DM) as shown in FIG. 3. In this configuration, a user (mobile station) is allocated on multiple resource blocks, which are distributed over a range of resource blocks. In distributed mode a number of different implementation options are possible. In the example shown in FIG. 3, a pair of users (MSs ½ and MSs ¾) shares the same resource blocks. Several further possible exemplary implementation options may be found in 3GPP RAN WG #1 Tdoc. R1-062089, "Comparison between RB-level and Sub-carrier-level Distributed Transmission for Shared Data Channel in E-UTRA Downlink", August 2006 (available at http://www.3gpp.org and incorporated herein by reference).

It should be noted, that multiplexing of localized mode and distributed mode within a sub-frame is possible, where the amount of resources (RBs) allocated to localized mode and distributed mode may be fixed, semi-static (constant for tens/hundreds of sub-frames) or even dynamic (different from sub-frame to sub-frame).

In localized mode as well as in distributed mode in—a given sub-frame—one or multiple data blocks (which are inter alia referred to as transport-blocks) may be allocated separately to the same user (mobile station) on different resource blocks, which may or may not belong to the same service or Automatic Repeat reQuest (ARQ) process. Logically, this can be understood as allocating different users.

L1/L2 Control Signaling

In order to provide sufficient side information to correctly receive or transmit data in systems employing packet scheduling, so-called L1/L2 control signaling (Physical Downlink Control CHannel-PDCCH) needs to be transmitted. Typical operation mechanisms for downlink and uplink data transmission are discussed below.

Downlink Data Transmission

Along with the downlink packet data transmission, in existing implementations using a shared downlink channel, such as 3GPP-based High Speed Data Packet Access (HSDPA), L1/L2 control signaling is typically transmitted on a separate physical (control) channel.

This L1/L2 control signaling typically contains information on the physical resource(s) on which the downlink data is transmitted (e.g., subcarriers or subcarrier blocks in case of OFDM, codes in case of CDMA). This information allows the mobile station (receiver) to identify the resources on which the data is transmitted. Another parameter in the control signaling is the transport format used for the transmission of the downlink data.

Typically, there are several possibilities to indicate the transport format. For example, the transport block size of the data (payload size, information bits size), the Modulation and Coding Scheme (MCS) level, the Spectral Efficiency, the code rate, etc. may be signaled to indicate the transport format (TF). This information (usually together with the resource allocation) allows the mobile station (receiver) to identify the information bit size, the modulation scheme and the code rate in order to start the demodulation, the de-rate-matching and the decoding process. In some cases the modulation scheme maybe signaled explicitly.

In addition, in systems employing Hybrid Automatic Repeat reQuest (HARQ), HARQ information may also form part of the L1/L2 signaling. This HARQ information typically indicates the HARQ process number, which allows the mobile station to identify the Hybrid ARQ process on which the data is mapped, the sequence number or new data indicator, allowing the mobile station to identify if the transmission is a new packet or a retransmitted packet and a redundancy and/or constellation version. The redundancy version and/or constellation version tells the mobile station, which Hybrid ARQ redundancy version is used (required for de-rate-matching) and/or which modulation constellation version is used (required for demodulation)

A further parameter in the HARQ information is typically the UE Identity (UE ID) for identifying the mobile station to receive the L1/L2 control signaling. In typical implementations this information is used to mask the CRC of the L1/L2 control signaling in order to prevent other mobile stations to read this information.

The table below (Table 1) illustrates an example of a L1/L2 control channel signal structure for downlink scheduling as known from 3GPP TR 25.814 (see section 7.1.1.2.3—FFS=for further study):

TABLE 1

| | Field | | Size | Comment |
|---|---|---|---|---|
| Cat. 1 (Resource indication) | ID (UE or group specific) | | [8-9] | Indicates the UE (or group of UEs) for which the data transmission is intended |
| | Resource assignment | | FFS | Indicates which (virtual) resource units (and layers in case of multi-layer transmission) the UE(s) shall demodulate. |
| | Duration of assignment | | 2-3 | The duration for which the assignment is valid, could also be used to control the TTI or persistent scheduling. |
| Cat. 2 (transport format) | Multi-antenna related information | | FFS | Content depends on the MIMO/beamforming schemes selected. |
| | Modulation scheme | | 2 | QPSK, 16QAM, 64QAM. In case of multi-layer transmission, multiple instances may be required. |
| | Payload size | | 6 | Interpretation could depend on e.g., modulation scheme and the number of assigned resource units (c.f., HSDPA). In case of multi-layer transmission, multiple instances may be required. |
| Cat. 3 (HARQ) | If asynchronous hybrid ARQ is adopted | Hybrid ARQ process number | 3 | Indicates the hybrid ARQ process the current transmission is addressing. |
| | | Redundancy version | 2 | To support incremental redundancy. |
| | | New data indicator | 1 | To handle soft buffer clearing. |

TABLE 1-continued

| Field | | Size | Comment |
| --- | --- | --- | --- |
| If synchronous hybrid ARQ is adopted | Retransmission sequence number | 2 | Used to derive redundancy version (to support incremental redundancy) and 'new data indicator' (to handle soft buffer clearing). |

Uplink Data Transmission

Similarly, also for uplink transmissions, L1/L2 signaling is provided on the downlink to the transmitters in order to inform them on the parameters for the uplink transmission. Essentially, the L1/L2 control channel signal is partly similar to the one for downlink transmissions. It typically indicates the physical resource(s) on which the UE should transmit the data (e.g., subcarriers or subcarrier blocks in case of OFDM, codes in case of CDMA) and a transport format the mobile station should use for uplink transmission. Further, the L1/L2 control information may also comprise Hybrid ARQ information, indicating the HARQ process number, the sequence number or new data indicator, and further the redundancy and/or constellation version. In addition, there may be a UE Identity (UE ID) comprised in the control signaling.

Variants

There are several different flavors how to exactly transmit the information pieces mentioned above. Moreover, the L1/L2 control information may also contain additional information or may omit some of the information. For example, the HARQ process number may not be needed in case of using no or a synchronous HARQ protocol. Similarly, the redundancy and/or constellation version may not be needed, if for example Chase Combining is used (i.e., always the same redundancy and/or constellation version is transmitted) or if the sequence of redundancy and/or constellation versions is pre-defined.

Another variant may be to additionally include power control information in the control signaling or MIMO related control information, such as, e.g., pre-coding information. In case of multi-codeword MIMO transmission transport format and/or HARQ information for multiple code words may be included.

In case of uplink data transmission, part or all of the information listed above may be signaled on uplink, instead of on the downlink. For example, the base station may only define the physical resource(s) on which a given mobile station shall transmit. Accordingly, the mobile station may select and signal the transport format, modulation scheme and/or HARQ parameters on the uplink. Which parts of the L1/L2 control information is signaled on the uplink and which proportion is signaled on the downlink is typically a design issue and depends on the view how much control should be carried out by the network and how much autonomy should be left to the mobile station.

Another, more recent suggestion of a L1/L2 control signaling structure for uplink and downlink transmission may be found in 3GPP TSG-RAN WG1#50 Tdoc. R1-073870, "Notes from offline discussions on PDCCH contents", August 2007, available at http://www.3gpp.org and incorporated herein by reference.

As indicated above, L1/L2 control signaling has been defied for systems that are already deployed to in different countries, such as for example, 3GPP HSDPA. For details on 3GPP HSDPA it is therefore referred to 3GPP TS 25.308, "High Speed Downlink Packet Access (HSDPA); Overall description; Stage 2", version 7.4.0, September 2007 (available at http://www.3gpp.org) and Harri Holma and Antti Toskala, "WCDMA for UMTS, Radio Access For Third Generation Mobile Communications", Third Edition, John Wiley & Sons, Ltd., 2004, chapters 11.1 to 11.5, for further reading.

L1/L2 Control Signaling Reduction Techniques

For scheduling (delay-sensitive) services with small data packets, such as, e.g., VoIP (Voice over IP) or gaming, the downlink L1/L2 control signaling can be quite significant if each small data packet needs to be signaled. In a 5 MHz 3GPP LTE system, up to 400 VoIP users can be supported as has been shown in 3GPP TSG-RAN WG1 Meeting #46 Tdoc. R1-062179, "VoIP System Performance for E-UTRA Downlink—Additional Results", (available at http://www.3gpp.org/ftp/tsg_ran/WG1_RL1/TSGR1_46/Docs/). This results in roughly 10 VoIP packets on the uplink and 10 VoIP packet on the downlink within a sub-frame, which requires 20 L1/L2 control channels (10 for uplink data transmission and 10 for downlink data transmission). Assuming that the payload size of an L1/L2 control channel carrying an uplink allocation is 35-45 bits and the payload size of an L1/L2 control channel carrying an downlink allocation is approximately 35-50 bits, this results in an downlink L1/L2 control channel overhead of roughly 25-34% (assuming QPSK rate 1/3 transmission of the L1/L2 control channels). This overhead is significantly larger than for other services (e.g., FTP, HTTP, audio/video streaming), where the data can be transmitted in large packets (assumed downlink L1/L2 control channel overhead in this case is approximately 8-12%). Therefore, within the 3GPP LTE standardization the several reduction techniques for services with small data packets are investigated. In the following two investigated schemes that are discussed by the 3GPP are briefly explained:

One scheme discussed is based on a grouping of users (e.g., in similar radio conditions) Examples of this scheme are described in the parallel European patent application no. EP 06009854.8, "RESOURCE RESERVATION FOR USERS IN A MOBILE COMMUNICATION SYSTEM" or in 3GPP TSG-RAN-WG2 Meeting #57 Tdoc. R2-070758, "Scheduling for downlink" (available at http://www.3gpp.org/ftp/tsg_ran/WG2_RL2/TSGR2_57/Documents/), both documents being incorporated herein by reference. In this scheme, a single downlink L1/L2 control channel with a special "group format" is used. This causes that less "group format" downlink L1/L2 control channels are required to be transmitted than "normal" L1/L2 control channels. Although the payload size of the "group format" L1/L2 control channels is larger than that of the "normal" L1/L2 control channel, a net saving in L1/L2 control signaling overhead is expected.

Another exemplary scheme is based on the use of a persistent allocation downlink resources and using with blind detection. Examples of this scheme are described in the parallel European patent application no. EP 06009854.8 mentioned above or in 3GPP TSG-RAN WG2 Meeting

56bis R2-070272, "Signalling optimized DL scheduling for LTE" (available at http://www.3gpp.org/ftp/tsg_ran/WG2_RL2/TSGR2_56bis/Documents/and incorporated herein by reference). In this exemplary scheme, a certain set of resource blocks and/or subframes (e.g., a certain time-frequency window) and possibly a certain set of transport formats is pre-configured and the UE tries to blindly decode the possibly transmitted packet on the pre-configured resources with the pre-configured set of transport formats. For the initial transmission of a packet the downlink L1/L2 control channel is omitted, whereas retransmissions are allocated by the downlink L1/L2 control channel. Assuming that the packet error rate for the first transmission of a packet is considerably low, L1/L2 control signaling overhead is reduced, e.g., for a 10% packet error rate for the first transmission, the L1/L2 control signaling overhead can be roughly reduced by 90%. Typically, in such a scheme, the L1/L2 control signaling transmitted with the retransmission carries information about the initial transmission (e.g., information about to a subframe at which the initial transmission took place, information about the resource block(s) on which the initial transmission has been allocated and/or information about the transport format).

It is therefore desirable to reduce of the mobile station (UE) complexity with respect to decoding the downlink L1/L2 control channels. It is further desirable to achieve an additional reduction of the downlink L1/L2 control signaling overhead and increase in signaling efficiency. Additionally, it may be appreciated by those skilled in the art to implement a simple and less complex downlink L1/L2 control channel structure.

SUMMARY OF THE INVENTION

One main aspect of the invention is the definition of at least one so-called code point in the control channel signals, such as for example the L1/L2 control channels as described previously herein. A code point may therefore be considered one specific value of a field of the control channel signal which is indicating the scheduling mode for an associated transmission of user data of a protocol data unit, and further the control channel format. Alternatively, a code point may also be defined as a specific combination of values represented by more than one control channel signal field. Likewise, different code points may be defined for the control channel signal.

One benefit that can be achieved by using code points is the avoidance of flag fields which indicate the scheduling mode or the format of the control channel. This reduces the size of the control channel and, therefore, the signaling overhead.

According to another aspect of the invention, different scheduling modes may be used for the transmission of the user data of a service, whereby a code point is used to identify the use of a specific scheduling mode. The different scheduling modes may utilize different formats of the control channel signal so that the code point further indicates a specific format of the control channel.

Further, the use of different scheduling schemes also increases the flexibility in control channel signaling so that the control channel overhead may be reduced. For example, there may be two different scheduling modes defined, wherein one of the scheduling modes only signals control channel information for retransmissions of a protocol data packets (in contrast to providing a control channel signal for each protocol data unit transmission—which could be the case for the other, second scheduling mode). This exemplary scheduling mode may for example be advantageous for the transmission of user data of delay-sensitive services, where the (average) user data size of a protocol data unit is small in comparison to other service types.

According to one embodiment of the invention, a control channel signal is defined. This control channel signal is suitable for the use in a mobile communication system providing at least two different scheduling modes. The control channel signal comprises at least one control information field consisting of a number of bits, where at least one of the values that can be represented by the bits of the at least one control information field defines a code point for indicating the scheduling mode for an associated transmission of user data in for of a protocol data unit and the control channel format to the receiver. As indicated above, alternatively, a code point may also be defined by a combination of predetermined values of different control information fields in the control channel signal. For example, at least the HARQ process field and the RV field may be used to define the code point.

In one variation the number of bits of the control channel signal is equal for at least two scheduling modes. This may be for example advantageous to simplify the rate matching for the control channels or to reduce the number of different control channel sizes a mobile station has to decode.

The at least one control channel field that is used to indicate a scheduling mode by means of the code point may be located at a fixed position within the control channel signal for all control channel formats. Accordingly, in case the control channel format size is equal for the different scheduling modes and the control channel field(s) to indicate a code point is/are located at fixed position(s), the detection of the code point in the control channel signal is simplified for the receiver of the control channel signal.

Alternatively, in another embodiment of the invention, the control channel signal indicates plural code points. These plural code points indicate the use of one scheduling mode but different transport formats of the protocol data unit. Accordingly, not only one specific values representable by the bits of a control channel field (or fields) may be defined as a code point, but different values may be used to indicate different code points. Though there may be plural code points defined, these different code points do not necessarily indicate a corresponding number of different scheduling modes. For example, all code points defined for a control channel field may indicate the same scheduling mode, but different control channel information.

In one exemplary embodiment of the invention, the code point is specified as a specific value of the HARQ process field contained in the control channel signal. For example, one HARQ process may be reserved for a scheduling mode and the value represented by the bits of the HARQ process field for indicating the reserved HARQ process defines the code point. Accordingly, in this example, the code point indicates the scheduling mode (dependent on which the remaining control channel signal may be interpreted) and simultaneously specifies the HARQ process of the protocol data unit.

In another alternative embodiment of the invention the at least one control information field for indicating the code point is a resource allocation field of the control channel signal. The resource allocation field may optionally comprise a header and the code point is could be defined by a specific bit combination of header bits of the resource allocation field.

In another embodiment, the control information field of the control channel signal defining the codepoint is a transport format field of the control channel signal. For example, this transport format field could indicate plural code points, wherein a subset of the plural code points indicates the use of one scheduling mode.

According to a further embodiment of the invention, the control information field defining the codepoint is used to indicate either a persistent scheduling mode or a dynamic scheduling mode.

Another embodiment of the invention relates to a scheduling unit for use in a mobile communication system providing at least two different scheduling modes. According to this exemplary embodiment, the scheduling unit capable of generating and transmitting a control channel signal as defined herein.

In a variation of this embodiment, the scheduling unit is further adapted to transmit a control channel signal only for retransmissions of the protocol data unit, if a first scheduling mode is used for the transmission of user data.

In an exemplary embodiment, the scheduling unit is adapted to utilize the first scheduling mode for the transmission of protocol data units having a size below a threshold (e.g., for protocol data units of a delay-critical service, such as VoIP). The second scheduling mode may be used for the transmission of protocol data units having a size above or equal to the threshold (i.e., for example for user data of delay-insensitive services).

In another exemplary embodiment, the scheduling unit is adapted to utilize the first scheduling mode for the transmission of protocol data mapped onto a first set of priority queues or logical channels (e.g., for protocol data units of a delay-critical service, such as VoIP). The second scheduling mode may be used for the transmission of protocol data units mapped onto a second set of priority queues or logical channels (i.e., for example for user data of delay-insensitive services).

As indicated above, the control channel format may be different for the different scheduling modes, so that the scheduling unit is capable of generating the different control channel signal formats depending on the scheduling mode used for the transmission of user data.

The scheduling unit according to another embodiment of the invention uses the HARQ process field of the control signal as the at least one control information field for indicating the code point. In an exemplary variation of this embodiment, one HARQ process is reserved for one scheduling mode and the value represented by the bits of the HARQ process field for indicating the reserved HARQ process defines the code point.

Alternatively, according to a further embodiment of the invention, the control information field is a transport format field of the control channel signal. In this exemplary embodiment, the transport format field may for example indicate plural code points, and a subset of the plural code points could for example indicate the use of one scheduling mode.

In another exemplary embodiment of the invention, the first scheduling mode is a persistent scheduling mode and the second scheduling mode is a dynamic scheduling mode.

Another embodiment of the invention is providing a base station comprising a scheduling unit according to one of the different embodiments of the invention described herein.

In one embodiment of the invention, the base station further comprises a transmitter unit for transmitting a control channel signal generated by the scheduling unit and protocol data units comprising user data to a mobile terminal. The base station is further capable of controlling the base station's transmitter unit to transmit the control channel signal only for retransmissions of the protocol data unit, in case a first scheduling mode out of at least two different scheduling modes is used for the transmission of the protocol data unit.

The base station according to another embodiment further comprises a receiver unit for receiving a feedback message from the mobile station. The feedback message indicates, whether a protocol data unit previously transmitted by the base station has been successfully decoded by the mobile station.

In some embodiments of the invention, the first scheduling mode is used for the transmission of the user data to the mobile terminal, and a feedback message is received by the receiver unit of the base station for an initial transmission of the protocol data unit carrying the user data. It may be assumed that this feedback message is indicating that the protocol data unit has not been decoded successfully by the mobile station. Accordingly, the base station causes the scheduling unit to generate a control channel signal for a retransmission of the protocol data unit. Moreover, the base station may also cause its transmitter unit to retransmit the protocol data unit and the generated control channel signal to the mobile station. This control channel signal at least indicates the transport format and the downlink physical channel resources used for the retransmission and the initial transmission of the protocol data unit.

A further embodiment of the invention relates to a mobile station for use in a mobile communication system and for receiving user data on the downlink in form of protocol data units. This mobile station comprises a receiver unit for receiving from a base station a subframe of a downlink physical channel, and for performing a blind detection on the received subframe to thereby decode an initial transmission of a protocol data unit conveying user data within the received subframe. The mobile station further comprises a transmitter unit for transmitting negative feedback to the base station indicating that the protocol data unit has not been decoded successfully during blind detection. In response to the negative feedback, the receiver unit will receive another subframe of the downlink physical channel from the base station comprising a control channel signal indicating the transport format and the downlink physical channel resources used for the retransmission and initial transmission of the protocol data unit. Accordingly, the mobile station's decoder is decoding the protocol data unit based on the control channel signal.

In a further embodiment of the invention, the mobile station comprises a (soft) buffer—such as for example an HARQ buffer—for temporarily storing the unsuccessfully decoded initial transmission of the protocol data unit. The decoder soft combines the initial transmission and the retransmission of the protocol data unit prior to decoding.

Another embodiment of the invention provides a computer-readable medium storing instructions that, when executed by a processor of a base station, cause the base station to provide control channel signals in a mobile communication system. The base station is caused to provide control channel signals in a mobile communication system by generating a control channel signal according to one of the different embodiments described herein, and transmitting the generated control channel signal in a subframe of a physical channel.

A further embodiment of the invention relates to a computer-readable medium storing instructions that, when executed by a processor of a mobile station, cause the mobile station for receive user data on the downlink in form of protocol data units by receiving from a base station a subframe of a downlink physical channel, and for performing a blind detection on the received subframe to thereby decode an initial transmission of a protocol data unit conveying user data within the received subframe, transmitting a negative feedback to the base station indicating that the protocol data unit has not been decoded successfully during blind detection, receiving, in response to the negative feedback, another subframe of the downlink physical channel from the base station comprising a control channel signal indicating the transport format and the downlink physical channel resources used for the retransmission and initial transmission of the protocol data unit, and decoding the protocol data unit based on the control channel signal.

The computer-readable medium according embodiment of the invention is further storing instructions that, when executed by the processor of the mobile station, cause the mobile station to temporarily store the unsuccessfully decoded initial transmission of the protocol data unit a buffer, and to soft combine the initial transmission and the retransmission of the protocol data unit prior to decoding.

BRIEF DESCRIPTION OF THE FIGURES

In the following, the invention is described in more detail in reference to the attached figures and drawings. Similar or corresponding details in the figures are marked with the same reference numerals.

DETAILED DESCRIPTION OF THE INVENTION

Figure 1:
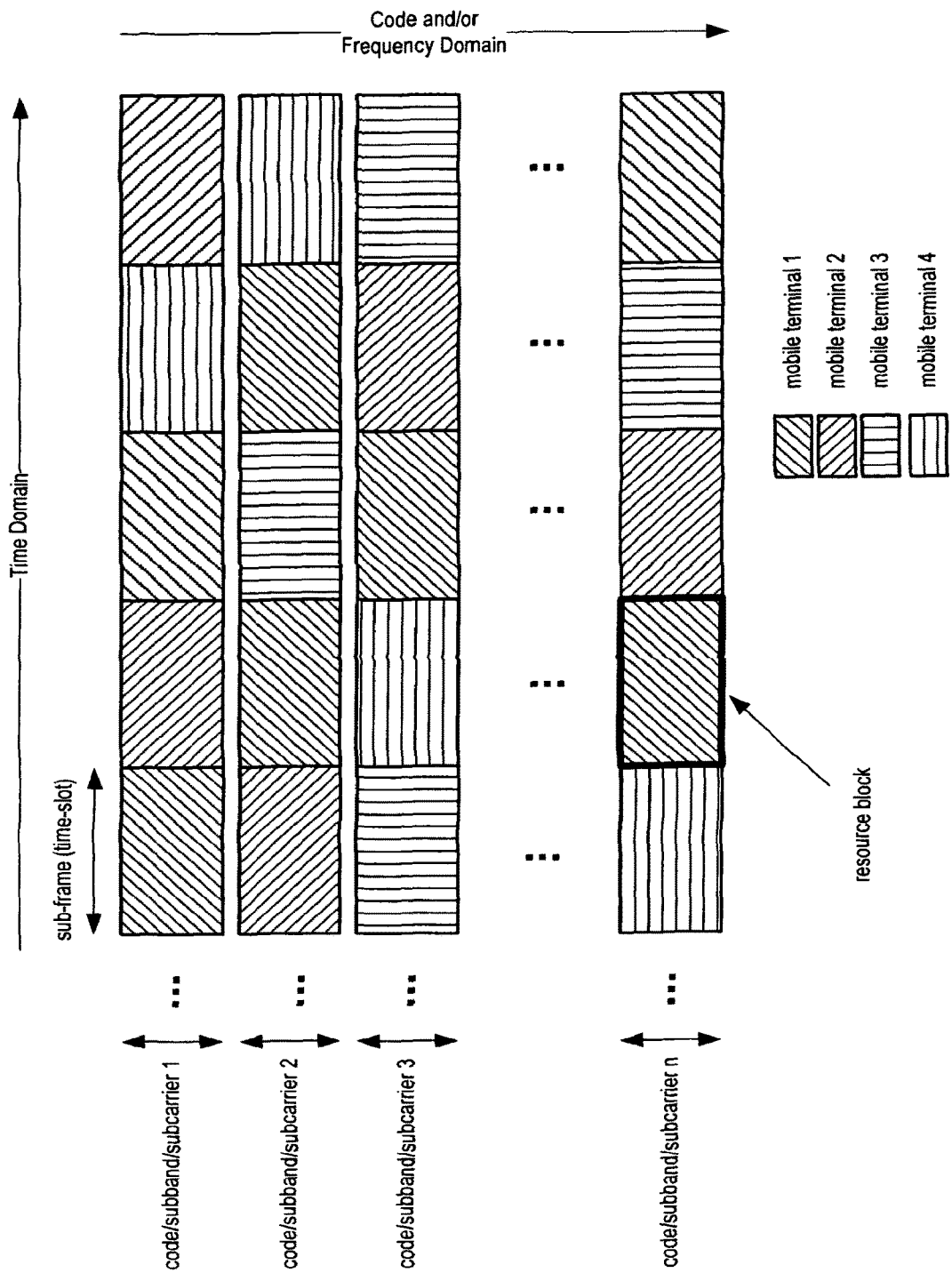
FIG. 1 shows an exemplary data transmission to users in an OFDMA system.

The following paragraphs will describe various embodiments of the invention. For exemplary purposes only, most of the embodiments are outlined in relation to an (evolved) UMTS communication system according to the SAE/LTE discussed in the Technical Background section above. It should be noted that the invention may be advantageously used for example in connection with a mobile communication system such as the SAE/LTE communication system previously described or in connection with multi-carrier systems such as OFDM-based systems, but the invention is not limited to its use in this particular exemplary communication network.

Before discussing the various embodiments of the invention in further detail below, the following paragraphs will give a brief overview on the meaning of several terms frequently used herein and their interrelation and dependencies. Generally, a protocol data unit may be considered a data packet of a specific protocol layer that is used to convey one or more transport blocks of user data. The user data are typically associated to a service such as for example a VoIP service.

In some embodiments of the invention, the protocol data unit is a MAC Protocol Data Unit (MAC PDU), i.e., a protocol data unit of the MAC (Medium Access Control) protocol layer. The MAC PDU conveys data provided by the MAC layer to the PHY (Physical) layer. Typically, for a single user allocation (one L1/L2 control channel—PDCCH—per user), one MAC PDU is mapped onto one transport block (TB) on Layer 1. A transport block defines the basic data unit exchanged between Layer 1 and MAC (Layer 2). Typically, the when mapping a MAC PDU onto a transport block one or multiple CRCs are added. The transport block size is defined as the size (number of bits) of a transport block. Depending on the definition, the transport size may include or exclude the CRC bits.

In general, the transport format defines the modulation and coding scheme (MCS) and/or the transport block size, which is applied for the transmission of a transport block and is, therefore, required for appropriate (de)modulation and (de)coding. In a 3GPP-based system as for example discussed in 3GPP TR 25.814, the following relationship between the modulation and coding scheme, the transport block size and the resource allocation size is valid:

$$TBS = CR \cdot M \cdot N_{RE}$$

where $N_{RE}$ is the number of allocated resource elements (RE)—one RE being identical to one modulation symbol—, CR is the code rate for encoding the transport block, and M is the number of bits mapped onto one modulation symbol, e.g., M=4 for 16-QAM.

Due to this relationship described above, the L1/L2 control signaling may only need to indicate either the transport block size or the modulation and coding scheme. In case the modulation and coding scheme should be signaled, there are several options how to implement this signaling. For example, separate fields for modulation and coding or a joint field for signaling both, the modulation and coding parameters may be foreseen. In case the transport block size should be signaled, the transport block size is typically not explicitly signaled, but is rather signaled as a TBS index. The interpretation of the TBS index to determine the actual transport block size may for example depend on the resource allocation size.

In the following, the transport format field on the L1/L2 control signaling is assumed to be indicating either the modulation and coding scheme or the transport block size. It should be noted, that the transport block size for a given transport block does typically not change during transmissions. However, even if the transport block size is not changed, the modulation and coding scheme may change between transmissions, e.g., if the resource allocation size is changed (as apparent for the described relationship above).

The main idea of the invention is the introduction of a so-called code point or code points to the control channel signal. A code point is a specific value representable by a bit combination of one field (out of plural fields) in the control channel signal format. Alternatively, a code point may be defined as a specific combination of the values of different control channel signal fields.

A code point (or code points) defined for the control channel signal is/are indicating the use of a specific scheduling mode for the transmission of the associated user data (in form of protocol data units). Depending on the code point, the receiver of the control channel signal (e.g., the mobile station) recognizes the scheduling mode being utilized and is capable of interpreting the control channel signal information (i.e., the values indicated by the bits of the different fields in the control channel signal) based on the code point, respectively the scheduling mode indicated by the code point.

In contrast to a (additional) flag (or bit) in the control channel signaling for indicating the scheduling mode, a code point is corresponding to (at least) one predetermined value of a (at least one) control channel signal field.

The use of code points avoids additional control signaling overhead (as for example implied by an additional flag to indicate the scheduling mode). For example, an HARQ field in the control channel signal indicating the HARQ process number used for transmitting the associated protocol data unit conveying the user data may have 3 bits which allows signaling 8 different values, while there may only be 6 HARQ processes available. Hence, one of the "remaining" values (or both) may be defined as a code point (or individual code points) to indicate a different scheduling mode. Alternatively, there may be 8 HARQ processes available (numbered 0 to 7), however, one (or more) of the processes (e.g., process no. $7=111_2$) are configured for transporting VoIP service data. Accordingly, this specific HARQ process number (e.g., process no. $7=111_2$) can be a code point yielding a specific scheduling mode (and thus optionally a specific control channel signal format). In both examples, no additional flag is needed for indicating a second scheduling mode, which reduces the control signaling overhead.

In one embodiment of the invention, the format of the control channel information signal (e.g., the configuration of the control channel in terms of its fields, the content of the fields, the size of the fields, and/or the interpretation of the different field values) depends on the respective scheduling mode. For example, it may be assumed that there are two different scheduling modes available, whereas the scheduling modes each yield a different control channel signal format. If the scheduler (e.g., located in a base station) sends the control channel signal yielding the first of the two scheduling modes by means of signaling a code point "value", the receiver of the control channel signal (for example a mobile station) uses a first reference information to interpret the control channel information, while the receiver uses a second reference information to interpret the content of the control channel information, if the second scheduling mode is indicated. Irrespective of the scheduling mode, the control channel signal size (in terms of the number of bits spent for control channel) is identical. The scheduling mode is implicitly indicated by the code point not being set (i.e., a value defining no code point is signaled).

In an advantageous embodiment of the invention, the different scheduling modes are associated with different service types of the user services (user data). For example, a first scheduling mode may be used for the transmission of user data of services that typically produce only protocol data units for transmission that are relatively small in size (e.g., below a certain threshold) and thus yield a high percentage of control signaling overhead in conventional systems in comparison to the user data. One example for such services are delay-sensitive services like VoIP, where only small data packets (or protocol data units) are transmitted, so that the control channel signaling overhead may be significant. The second scheduling mode may be for example a conventional scheduling mode and the control channel signaling may be designed as described in the Technical Background section.

The generation of small packet protocol data units may have another disadvantage in terms of system throughput. Typically, the number of control channels is limited (e.g., the control signaling may only indicate N different transmissions for a subframe of the physical data channel). Accordingly, only M transmissions of protocol data units can be signaled by the control channels per subframe. However, if there are mainly transmissions of services generating small protocol data unit sizes, not all physical radio resources (resource blocks) in a subframe of the physical data channel available for user data transmission may be needed to transmit M protocol data units, so that system resources are wasted. Accordingly, according to one embodiment of the invention, the user services that are typically generating protocol data units small in size, like a VoIP service, may be scheduled using one scheduling mode (scheduling mode 1), while other services are scheduled using another scheduling mode (scheduling mode 2).

Whether a user service is typically generating protocol data units small in size may be for example depend on the service class of the service, the type of the service, or may be judged based on the (average) protocol data unit size provided by the service.

As the control channel signal size may be assumed constant in the communication system (N bits/control channel)—for example to support simple rate matching—there may be no direct improvement to the ratio of protocol data unit size to control channel size. However, in this embodiment, there may be no control channel for initial transmission of protocol data units of services generating protocol data units small in size.

Instead, the receiver of the service (e.g., a mobile station) may receive a subframe from the physical data channel and tries to decode the information thereof using blind detection techniques to obtain the protocol data units. In order to avoid that the mobile station has to try decoding the received subframe information using all possible transport formats (i.e., all possible modulations and coding schemes available in the communication system) there may be a pre-configuration of the transport formats that may be used in connection with the scheduling mode so as to reduce the number of blind detection attempts to a reasonable number. Alternatively, the transport formats the mobile station should try for decoding when using blind detection and/or the subframes which the mobile station should receive and try blind decoding (e.g., every $k^{th}$ subframe) may also be configured (in advance) by control signaling (e.g., in a higher protocol layer).

If blind detection fails, i.e., no protocol data unit can be decoded successfully in a received subframe, the mobile station may store the received physical channel information of the subframe (e.g., the received soft-values of the received modulation symbols or the log-likelihood ratios for the demapped modulation symbols) in a buffer (e.g., the HARQ buffer) and sends a negative acknowledgment to the transmitter. The transmitter may then respond by sending a retransmission for the protocol data unit together with an associated control channel signal for this retransmission. Accordingly, in this exemplary embodiment, no control channel signal is sent for the initial transmission of a protocol data unit, but only for the retransmissions thereof. As the number of retransmissions may be supposed to be significantly lower than the number of initial transmissions, the control signaling overhead for the user data transmission may be significantly reduced in this scheduling mode (scheduling mode 1) for user data of services that yield small packet sizes, like VoIP services. The other services may be scheduled using another scheduling mode (scheduling mode 2) which may be for example a conventional scheduling mode where all transmissions of user data is accompanied by a respective control channel signal.

It should be noted that the exact implementation of the blind detection procedure is out of the scope of the invention and up to the system design and requirements. In general, blind detection is based on a concept similar to trial-and-error schemes, where the receiving apparatus receives a physical channel resource (for example a subframe) and tries to decode the received information by trying different resource allocations and transport formats to demodulate and decode the information of the received physical channel resource. In order to reduce the computational requirements of the receiving apparatus, some implementations only predefine or configure only a given number of different resource allocations and transport formats for transmissions that are received using blind detection. Furthermore, the receiving apparatus may only try to receive specific subframes of a physical channel (e.g., every $k^{th}$ subframe) or the subframes to receive and to perform blind detection on may be configured (in advance) by control signaling (e.g., in a higher protocol layer), as indicated above.

Figure 8:
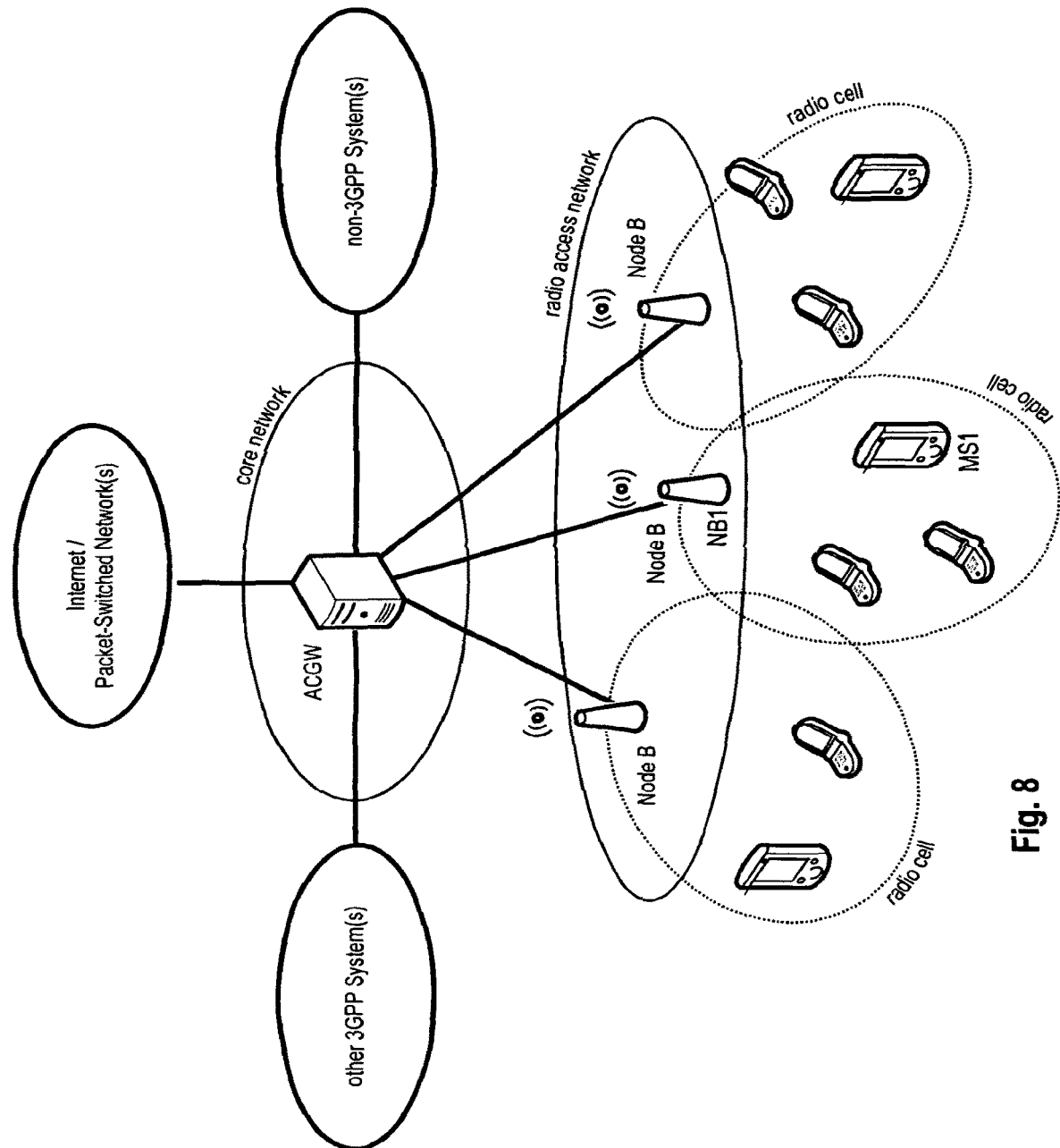
FIG. 8 shows a mobile communication system according to one embodiment of the invention, in which the message exchange of FIG. 7 may be implemented.

Next, the operation of the transmitter of the control channel signal according to one of the various embodiments described herein and the receiver thereof will be described in further detail, thereby exemplarily relating to the case of downlink data transmission via a (shared) downlink physical channel. For exemplary purposes a 3GPP LTE network as exemplified in FIG. 8 may be assumed. The mobile communication system of FIG. 8 is considered having a "two node architecture" consisting of at least one Access and Core Gateway (ACGW) and Node Bs. The ACGW may handle core network functions, such as routing calls and data connections to external networks, and it may also implement some RAN functions. Thus, the ACGW may be considered as to combine functions performed by GGSN and SGSN in today's 3G networks and RAN functions as for example radio resource control (RRC), header compression, ciphering/integrity protection.

The base stations (also referred to as Node Bs or enhanced Node Bs=eNode Bs) may handle functions as for example segmentation/concatenation of data, scheduling and allocation of resources, multiplexing and physical layer functions, but also RRC functions, such as outer ARQ. For exemplary purposes only, the eNodeBs are illustrated to control only one radio cell. Obviously, using beam-forming antennas and/or other techniques the eNodeBs may also control several radio cells or logical radio cells.

Figure 2:
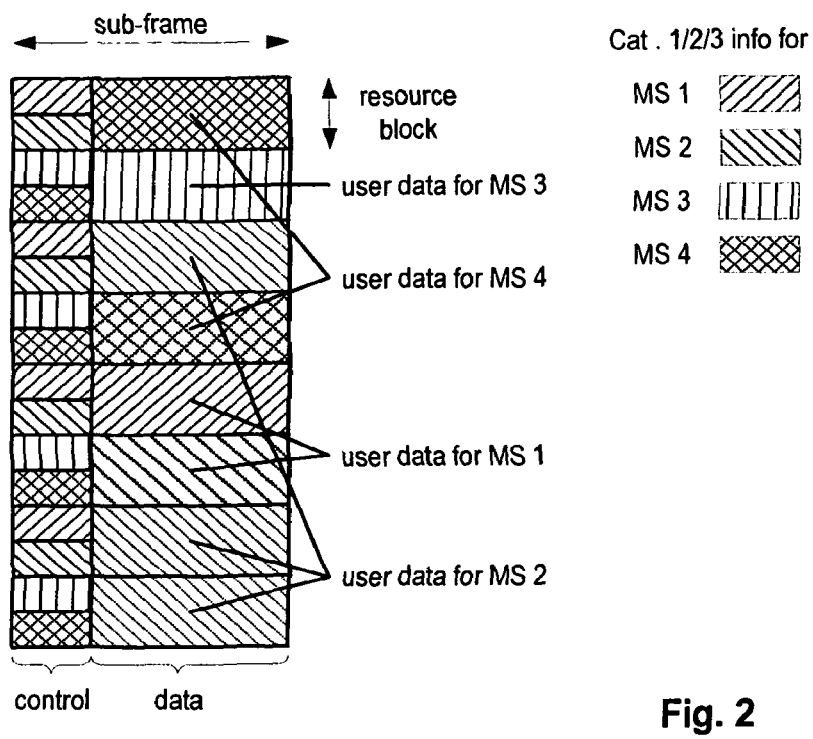
FIG. 2 shows an exemplary data transmission to users in an OFDMA system in localized mode (LM) having a distributed mapping of L1/L2 control signaling.
Figure 3:
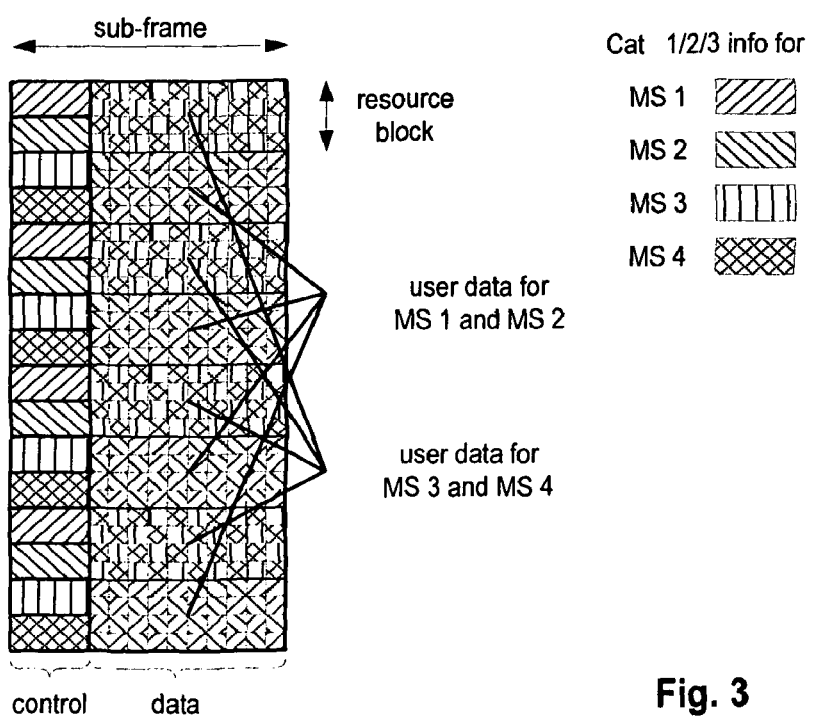
FIG. 3 shows an exemplary data transmission to users in an OFDMA system in distributed mode (DM) having a distributed mapping of L1/L2 control signaling.

In this exemplary network architecture, a shared data channel may be used for communication of user data (in form or protocol data units) on uplink and/or downlink on the air interface between mobile stations (UEs) and base stations (eNodeBs). This shared channel may be for example a Physical Uplink or Downlink Shared CHannel (PUSCH or PDSCH) as known in 3GPP LTE systems. It is also possible that the shared data channel and the associated control channels are mapped to the physical layer resources as shown in FIG. 2 or FIG. 3.

The control channel signals/information may be transmitted on separate (physical) control channels that are mapped into the same subframe to which the associated user data (protocol data units) are mapped or may be alternatively sent in a subframe preceding the one containing the associated information. In one example, the mobile communication system is a 3GPP LTE system, and the control channel signal is L1/L2 control channel information (e.g., information on the Physical Downlink Control CHannel-PDCCH). Respective L1/L2 control channel information for the different users (or groups of users) may be mapped into a specific part of the shared uplink or downlink channel, as exemplarily shown in FIGS. 2 and 3, where the control channel information of the different users is mapped to the first part of a downlink subframe ("control").

Figure 7:
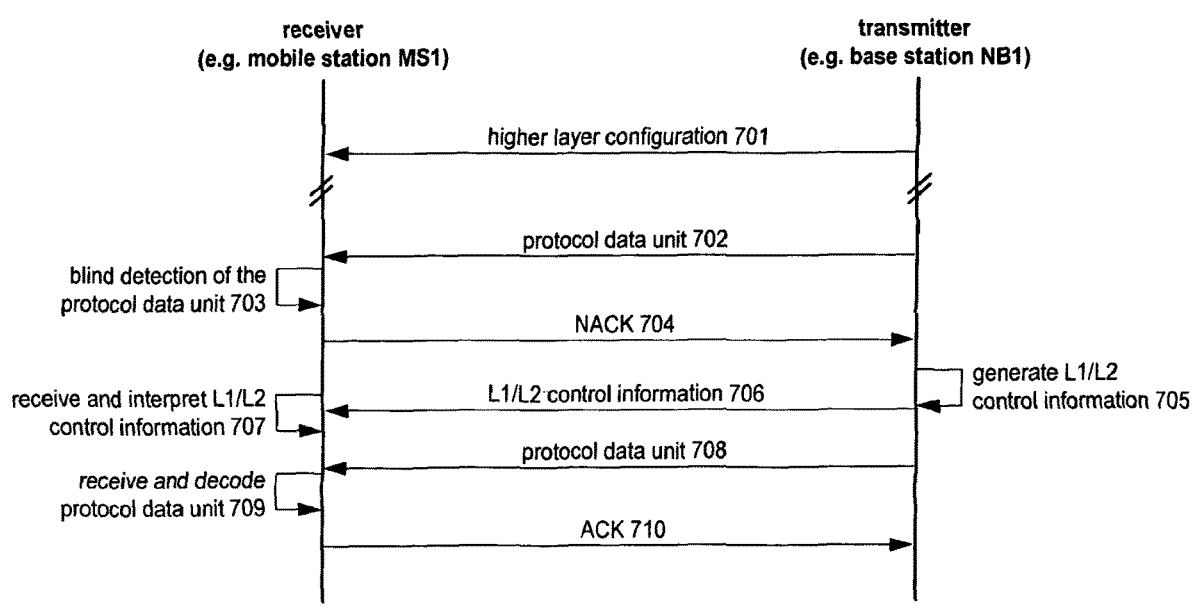
FIG. 7 shows an exemplary message exchange between a base station and a mobile station according to an embodiment of the invention for data transmission using scheduling mode 1.

FIG. 7 shows an exemplary message exchange between a base station and a mobile station according to an embodiment of the invention for data transmission using scheduling mode 1. The message exchange may be performed in the mobile communication network shown in FIG. 8. Accordingly, as the example in FIG. 7 is relating to the downlink data transmission, the transmitter shown in FIG. 7 may be assumed to correspond to base station/Node B NB1 in FIG. 8 and the receiver shown in FIG. 7 may be assumed to correspond to mobile station/UE MS1 in FIG. 8. Generally, it may be assumed in FIG. 7 that a retransmission protocol, such as Hybrid ARQ, is used between the transmitter (here: base station NB1) and receiver (here: mobile station MS1) of the data (protocol data unit) so as to ensure successful decoding of the data at the receiver.

In this exemplary 3GPP LTE system according to an embodiment of the invention a mobile station may simultaneously run services, that are transmitted using large data packets (e.g., FTP (File Transfer Protocol), HTTP (HyperText Transfer Protocol), audio/video streaming) and services that are transmitted using small data packets (e.g., VoIP (Voice over IP), gaming). As mentioned in the technical background section a reduction in downlink L1/L2 control signaling is desirable for the services using small data packets. In this exemplary embodiment a $1^{st}$ scheduling mode (scheduling mode 1) is used for the transmission of protocol data units (PDUs) of services typically having a small packet size, while a "normal" $2^{nd}$ scheduling mode (scheduling mode 2) is employed for other services. Therefore, a mobile station may receive data transmitted with a $1^{st}$ or $2^{nd}$ scheduling mode as defined below.

Scheduling mode 1 allows to reduce the L1/L2 control signaling overhead by using a persistent allocation of resources and utilizing blind detection for the reception, demodulation and decoding of the downlink data. Hence, for the initial transmission of a protocol data unit (packet) no L1/L2 control channel is transmitted, but only for first retransmission of the protocol data unit (and optionally for all or selected ones of further retransmissions).

Scheduling mode 2 may be considered a "normal" or "dynamic" scheduling mode. In this scheduling mode the initial transmission of a packet is signaled via a L1/L2 control channel and retransmissions may or may not be signaled via a L1/L2 control channel depending on the HARQ operation (e.g., asynchronous or synchronous or adaptive or non-adaptive). This scheduling mode may be for example implemented according to the scheduling proposed in the technical background section or as described in the parallel EP patent application no. EP 07024829.9, entitled "Control Channel Signaling using a Common Signaling Field for Transport Format and Redundancy Version" of the applicant (filed Dec. 20, 2007, representative's docket number: EP56004), which is incorporated herein by reference.

Further, it may be assumed for exemplary purposes that for a given sub-frame and given link (uplink or downlink), the mobile station MS1 is allocated either in scheduling mode 1 or in scheduling mode 2. Hence, there is no simultaneous allocation with both modes in a given subframe. However, the scheduling mode can change from sub-frame to sub-frame. Also, in a given sub-frame a mobile station may be scheduled.

FIG. 7 exemplifies the user data transmission using scheduling mode 1 described above, where it is assumed that the initial transmission is not signaled by a L1/L2 control signaling. In order to reduce the number of blind detection attempts, it may be assumed that only a reduced number of resource assignment and transport format candidates are allowed compared to scheduling mode 2, since the number of blind decodings and the required soft buffer size are limited. For example, in a 10 MHz system with 50 resource blocks (assuming 11 resource assignment bits) and $2^5$ transport formats at least 1275×32=40800 candidates for scheduling mode 1 are possible (assuming only consecutive allocations (50×(50+1)/2 possibilities) in the RB domain are possible and not considering other factors like, e.g., variable control region size). Due to UE complexity constraints, the number of possible blind decodings per subframe is significantly less than 40800.

Accordingly, the allowed resource assignment and transport format candidates may for example be pre-configured or configured 701 by the access network using higher layer protocols, such as for example a Radio Resource Control (RRC) Protocol or MAC control signaling. Assuming for exemplary purposes 32 resource allocation and transport formats combinations being (pre-)configured for scheduling mode 1, 32 blind decodings per subframe are required. In addition, the mobile station may not know the subframe in which the transmission of the initial transmission took place. I.e., the blind decoding may need to be required in several subframes and several subframes may need to be buffered.

In scheduling mode 1 it is assumed that the L1/L2 control channel of a retransmission carries some information on the resource assignment and/or the transport format of the initial transmission among possibly other information. In the above mentioned example, this would require 5 bits ($\log_2(32)$) to exactly determine the resource allocation and transport format, if the subframe number at which the initial transmission took place is known (less bits could be used in order to reduce the candidates). If the subframe number is not known to the mobile station additional information on the subframe number may be included to the L1/L2 control channel signal sent with the retransmission.

It should be noted that the increase of subframe candidates for the initial transmission does not impact the number of blind decoding complexity, since this is typically defined by number of blind decodings per subframe. However, the required buffer size at the receiver is increased since soft information (bits or modulation symbols) from additional subframes of the (shared) downlink physical channel may need to be buffered to allow for soft-combining prior to decoding. In case multiple subframe candidates for the initial transmission are possible, the L1/L2 control channel of a retransmission may carry some information of the subframe number being used for the initial transmission in order to reduce the blind combining complexity.

Returning to FIG. 7, base station NB1 transmits 702 the initial transmission of a protocol data unit to mobile station MS1 without control signaling, i.e., without explicitly indicating the transmission on the L1/L2 control channel of the subframe for mobile station MS1. For example due to a persistent allocation of resources on the (shared) downlink physical channel, mobile station MS1 assumes a user transmission occurring in the subframe and receives the subframe containing the initial transmission of the protocol data unit and performs a blind detection 703 on the information received from the physical channel by testing the resource allocations and transport formats candidates that have been configures 701 previously.

In the example shown in FIG. 7, it is assumed that the blind detection 703 is not successful, i.e., a successful decoding with the tested resource allocation and transport format combinations was not possible (e.g., due to a transmission error in the received information of the physical channel). Accordingly, mobile station MS1 transmits 704 a negative acknowledgement to base station NB1 to indicate the unsuccessful decoding of the initial transmission. Furthermore, in case the HARQ protocol supports soft-combining, mobile station MS1 stores the received physical channel information (e.g., the soft values of the individual modulation symbols or the log-likelihood ratios (LLRs) of the channel bits) for soft-combining with the retransmissions.

Base station NB1 receives the negative acknowledgment (NACK) and generates 705 a L1/L2 control channel signal for the retransmission of the protocol data unit. The content of the L1/L2 control channel signal will be discussed in further detail below with respect to FIGS. 5 and 6. Subsequently, base station NB1 transmits 706, 708 the L1/L2 control channel signal and the retransmission of the protocol data unit to mobile station MS1.

Mobile station MS1 receives the subframe comprising the L1/L2 control channel signal and the retransmission of the protocol data unit and interprets the content of the control channel signal depending on the scheduling mode indicated in the control channel signal. Using the control channel information comprised in the control channel signal from base station NB1, mobile station MS1 subsequently tries to decode 709 the protocol data unit. Optionally, if soft-combining is provided by the HARQ protocol, the information in the soft buffer of the respective HARQ process may are combined with the received 708 retransmission of the protocol data unit prior to decoding 709. If the decoding has been successful, mobile station MS1 sends 710 a positive acknowledgement (ACK) to base station NB1. If decoding of the protocol data unit is not successful, a NACK may be sent and—if soft-combining is utilized—the received (shared) downlink physical channel information of the retransmission may also be stored in the associated HARQ soft buffer for later soft-combining with another retransmission.

Figure 9:
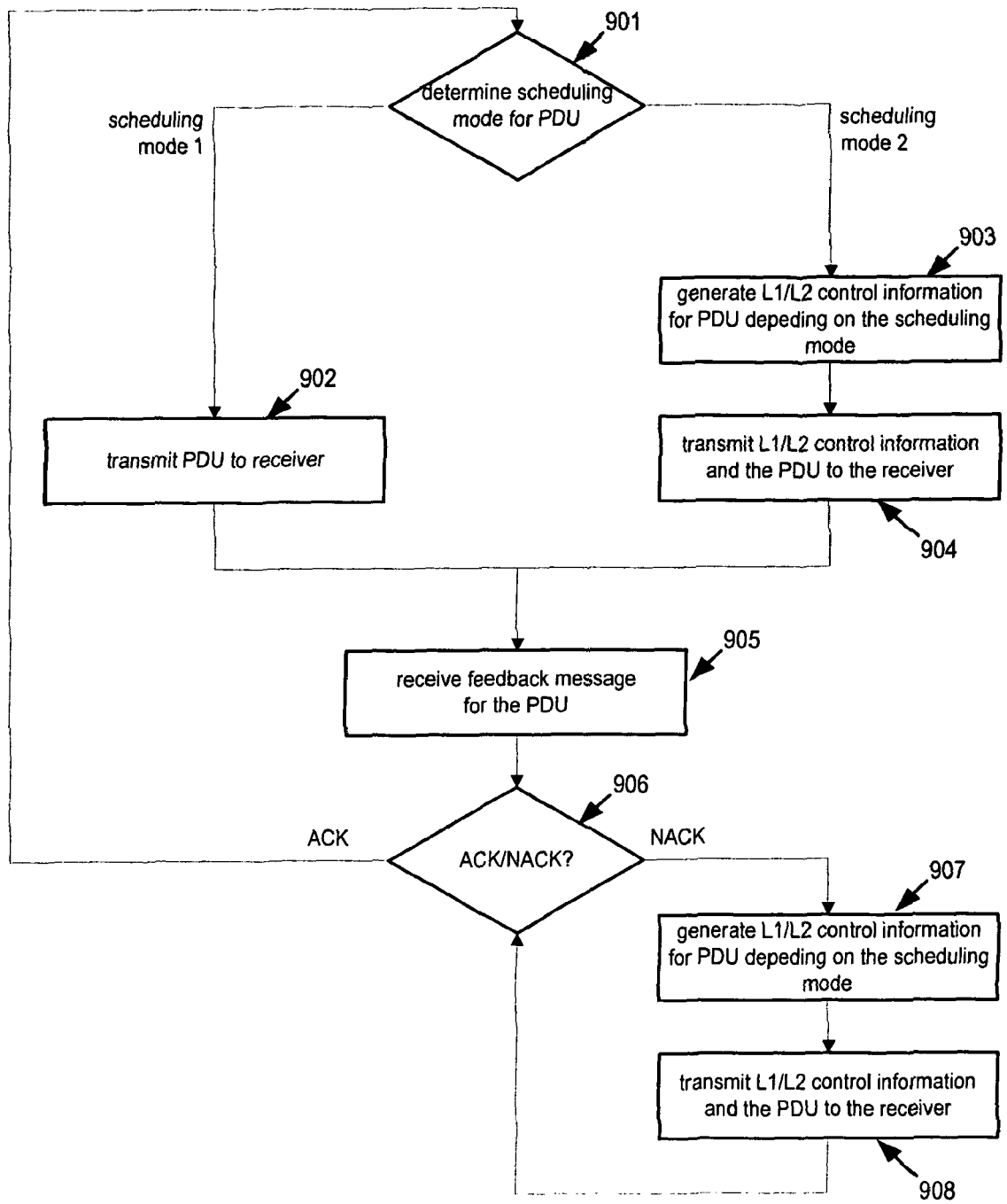
FIG. 9 shows a flow chart of an exemplary operation of a base station according to one embodiment of the invention.
Figure 10:
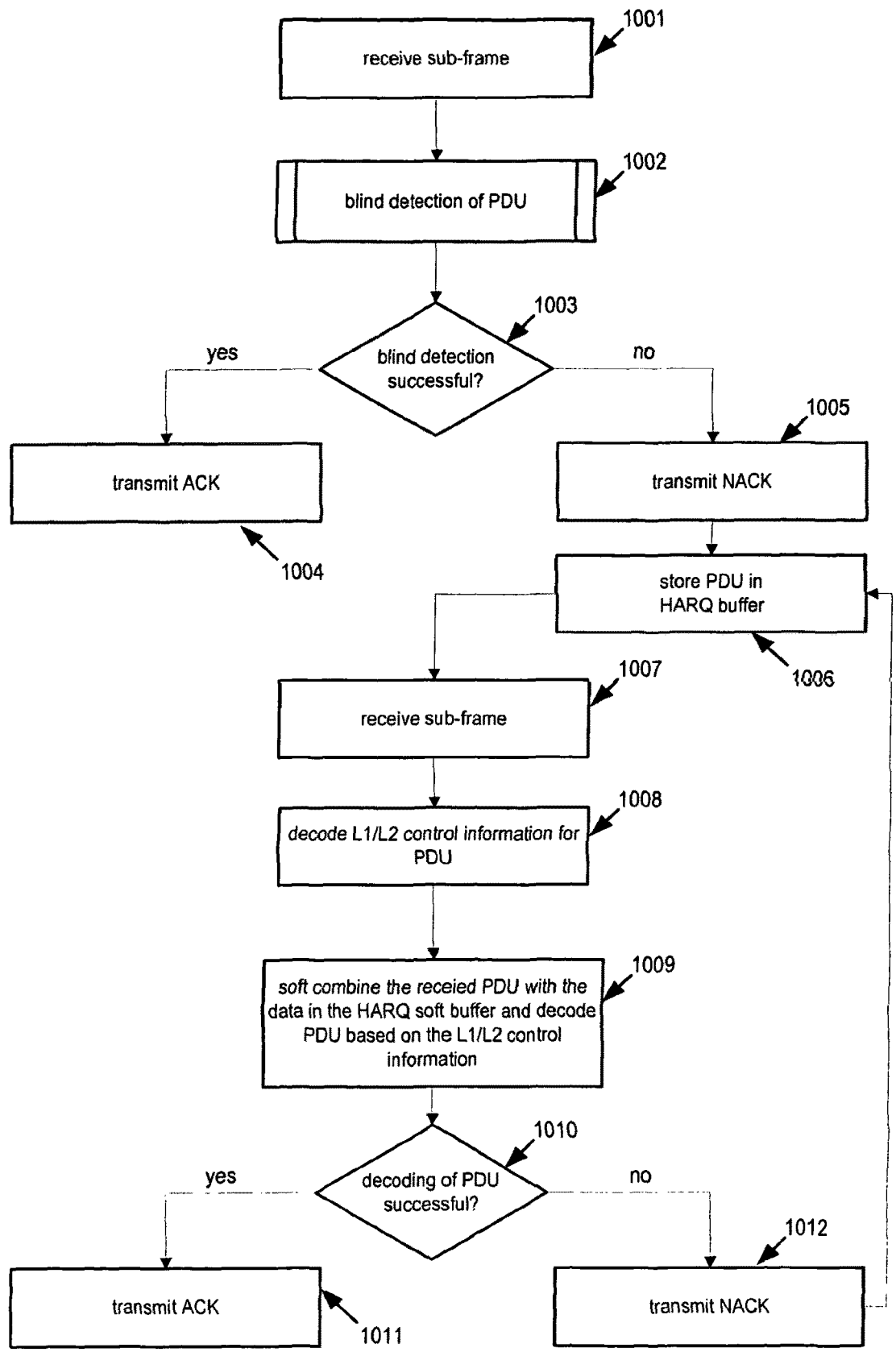
FIG. 10 shows a flow chart of an exemplary operation of a mobile station according to an exemplary embodiment of the invention using scheduling mode 1.

The operation of mobile station MS1 and base station NB1 described above with respect to FIG. 7 is exemplified in further detail in the flow charts shown in FIGS. 9 and 10. FIG. 9 shows a flow chart of an exemplary operation of a base station according to one embodiment of the invention, and FIG. 10 shows a flow chart of an exemplary operation of a mobile station according to an exemplary embodiment of the invention using scheduling mode 1.

In FIG. 9, upon receiving a new protocol data unit for transmission at the MAC protocol entity of base station NB1 for transmission to mobile station MS1, the scheduling unit of base station NB1 first determines 901 the scheduling mode that is to be used for the new protocol data unit.

In case the protocol data unit is to be transmitted using scheduling mode 1, base station NB1 transmits 902 the protocol data unit to mobile station MS1 (without control signaling) in a similar fashion as described with respect to step 702 of FIG. 7 using a resource allocation and transport format combination that has been for example pre-configured or configured by a special L1/L2 control channel format or higher layer protocol (see step 701 in FIG. 7).

If the protocol data unit is to be transmitted using scheduling mode 2, base station NB1 selects the appropriate resource allocation and transport format for the transmission of the protocol and generates 903 a L1/L2 control channel signal indicating the selected resource allocation and transport format for the protocol data unit and not setting the code point value in the field in order to indicate scheduling mode 2 to mobile station MS1. Next, base station NB1 transmits 904 the generated control channel signal and the protocol data unit to mobile station MS1.

Figure 4:
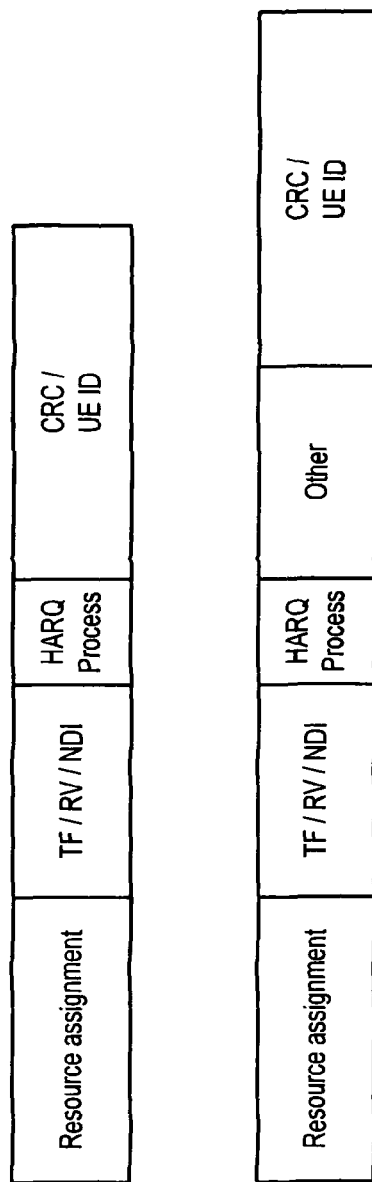
FIG. 4 shows two exemplary L1/L2 control channel signal formats for a specific scheduling mode (scheduling mode 2), according to one embodiment of the invention.

In an exemplary embodiment of the invention, it is assumed that a L1/L2 control channel in case of scheduling mode 2 contains at least the information depicted in Table 2 and has one of the control channel formats shown in FIG. 4. The upper control channel format in FIG. 4 is indicating the minimum content of the control channel signal according to the exemplary definition in Table 2. The second control channel format at the bottom of FIG. 4 comprises the same control channel information as the upper control channel format and optional additional information, such as, e.g., power control for Physical Uplink Control CHannel (PUCCH)—e.g., for CQI (Channel Quality Indicator) or ACK/NACK—precoding information, transport format information for $2^{nd}$ codeword, HARQ information for 2nd codeword may be also contained. This additional information may vary in size as indicated by the question mark in Table 2.

successfully decoded at mobile station MS1. If so, the next protocol data unit may be sent.

If no successful decoding of the protocol data unit is indicated by the feedback message, base station NB1 selects the appropriate resource allocation and transport format for the transmission of the protocol data unit (typically the transport block size is constant for all transmissions of a protocol data unit) and generates 907 a L1/L2 control channel signal indicating the selected resource allocation and transport format for the protocol data unit and setting an appropriate value in the field that is used to indicate the scheduling mode to mobile station MS1. Here, the L1/L2 control channel signal format may depend on the utilized scheduling mode for the protocol data unit.

In case of utilizing scheduling mode 1, the generated L1/L2 control channel signal may for example comprise the resource allocation for the already sent initial transmission (see block 902) and the retransmission of the protocol data unit to be sent as well as the transport format for the initial transmission and the retransmission of the protocol data unit (which should however not change or could be calculated from each other in typical cases). The indication of the resource allocation and transport format of the initial transmission in the control channel signal sent for the retransmission of the protocol data unit may be used by mobile station MS1 to again try decoding the initial transmission (stored in the HARQ buffer) using the control channel information, but is typically used to properly combine the current retransmission with the correct content from the HARQ buffer.

In case of utilizing scheduling mode 2 for the protocol data unit the control channel information may have a similar content to those generated and sent in steps 903 and 904. Alternatively, the control channel signal may be formed for initial transmissions and retransmissions of a protocol data unit as described in European patent application no. EP 07024829.9 mentioned previously herein.

Upon having generated 907 the control channel signal associated to the retransmission of the protocol data unit, the

TABLE 2

| Field | Bits | Comment |
| --- | --- | --- |
| Resource assignment | $\left\lceil \log_2\left(\frac{N_{RB}(N_{RB}+1)}{2}\right) \right\rceil$ | Number of bits depends on the resource allocation scheme and on the system bandwidth<br>Number of bits depends on system bandwidth, i.e., on the number of resource blocks $N_{RB}$ |
| CRC/UE ID | 16 | MAC UE ID implicitly encoded in the CRC |
| Transport format/<br>Redundancy version<br>(New Data Indicator<br>(or Sequence number)) | 5 | Transport Format: Transport Block Size or MCS level<br>May be a separate fields or jointly encoded field |
| Hybrid ARQ process number | 3 | |
| Additional Information | ? | E.g., Power control for PUCCH, Precoding information, Transport format information for $2^{nd}$ codeword, HARQ information for $2^{nd}$ codeword |

Returning to FIG. 9, irrespective of the scheduling mode, base station NB1 may receive 905 a feedback for the initial transmission of the protocol data unit. Accordingly, base station NB1 determines 906 based on the feedback from mobile station MS1, whether the protocol data unit could be control channel signal and the retransmission of the protocol data unit is transmitted 908 by base station NB1.

FIG. 10 shows a flow chart of an exemplary operation of a mobile station according to an exemplary embodiment of the invention using scheduling mode 1. In a first step, mobile station MS1 receives 1001 a subframe from the (shared) downlink physical channel. For example due to a persistent allocation or reservation of resources on the (shared) downlink physical channel, mobile station MS1 is aware of a potential user transmission occurring in the subframe and performs a blind detection 1002 on the information received from the physical channel by testing the resource allocations and transport formats candidates that have for example been configured previously.

In case the blind detection is successful, i.e., the protocol data unit could be successfully decoded by mobile station MS1, mobile station MS1 transmits 1004 a positive acknowledgement (ACK) to base station NB1. If blind detection 1002 is not successful, i.e., no matching resource allocation and transport format is found (e.g., due to a transmission error in the received information of the physical channel), mobile station MS1 transmits 1005 a negative acknowledgement to base station NB1 to indicate the unsuccessful decoding of the initial transmission. Optionally, in case the HARQ protocol supports soft-combining, mobile station MS1 stores 1006 the received physical channel information (e.g., the soft values of the individual modulation symbols or the log-likelihood ratios (LLRs) of the channel bits) for soft-combining with the retransmissions in the HARQ buffer region associated to the protocol data unit's HARQ process.

After having sent a negative acknowledgement, mobile station MS1 further receives another subframe 1007 of the (shared) downlink physical channel. This subframe comprises a L1/L2 control channel signal that is indicating control channel information for the initial transmission and the retransmission of the protocol data packets, as for example described with respect to FIGS. 5 and 6 below. Upon successfully obtaining 1008 the control channel signal, mobile station MS1 may perform 1009 a soft-combining of the buffered physical channel information of the initial transmission and the physical channel information of the retransmission contained in the subframe received in step 1007 prior to decoding the protocol data unit. If it is determined 1010 by mobile station MS1 that the protocol data unit could be successfully decoded, mobile station MS1 transmits 1011 a positive acknowledgement to base station NB1. Otherwise it transmits 1012 a negative acknowledgement and stores the physical channel information of the retransmission contained in the subframe received in step 1007 in the HARQ buffer region of the process used for transmitting the protocol data unit.

As indicated previously herein, a code point may be defined in the HARQ process field of the control channel signal. In this example, the control channel signal is assumed to have a control channel field for signaling the HARQ process number of the protocol data unit.

Figure 5:
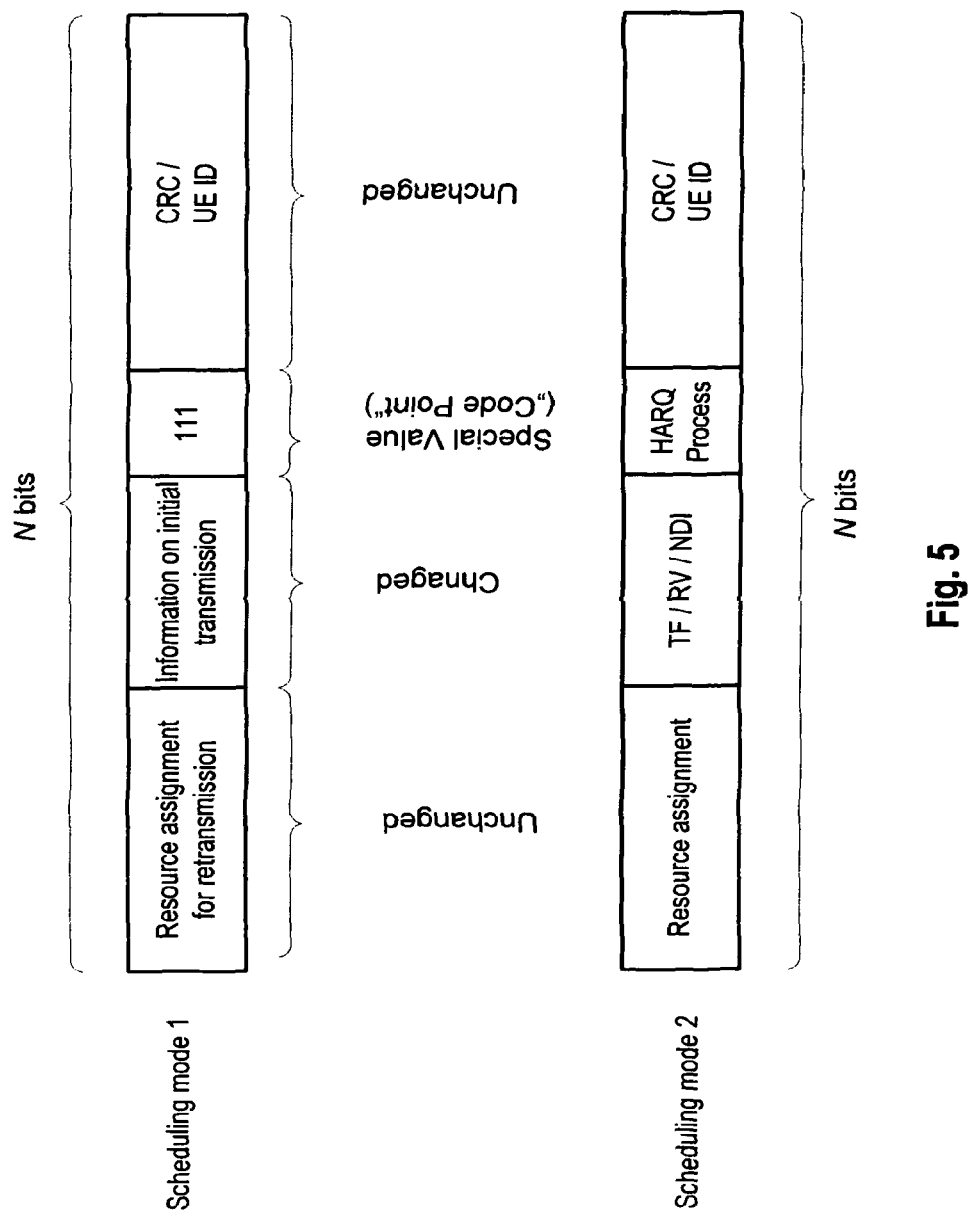
FIG. 5 shows an exemplary L1/L2 control channel signal according to one embodiment of the invention in which a HARQ filed is used to indicate a scheduling mode, and in which the use of the TF/RV/NDI field in the control channel signal is depending on the scheduling mode.

FIG. 5 shows an exemplary L1/L2 control channel signal according to one embodiment of the invention in which a HARQ filed is used to indicate a scheduling mode, and in which the use of the TF/RV/NDI field in the control channel signal is depending on the scheduling mode.

For scheduling mode 2, the TF/RV/NDI field is indicating the transport format (TF), the redundancy version (RV) and the new data indicator (NDI). These parameters of the control channel may be for example jointly encoded as exemplarily illustrated in FIG. 5 and as described in European patent application no. EP 07024829.9. Alternatively, these parameters of the protocol data unit may also be encoded separately in individual fields, or only the transport format and the redundancy version of the protocol data unit may be jointly encoded as also described in European patent application no. EP 07024829.9.

In order to allow for a reasonable soft buffer management, for data transmitted with scheduling mode 1 it may be beneficial to reserve a certain HARQ process out of the existing processes. In this case, a preconfigured process ("code point"), e.g., 111, may be used to indicate that the L1/L2 control channel has the format of scheduling mode 1.

In one exemplary embodiment, the resource assignment field is unchanged for scheduling mode 1 and 2, since this allows for having full flexibility for the resource allocation of the retransmission. Also the CRC/UE ID field (comprising the CRC checksum masked with the identifier of the mobile station or group of mobile stations to which the control channel information is destined) is not changed in the control channel signal format for scheduling mode 1 and scheduling mode 2, since it may be required to identify the targeted mobile station(s) and to prevent other mobile stations from reading the content of the given control channel.

In the example shown in FIG. 5, the content/interpretation of the TF/RV/NDI field(s) is (are) is depending on the scheduling mode. Using scheduling mode 1 for the transmission of the protocol data unit, the control channel signal comprises a resource assignment (RA) field indicating the resource block(s) of the subframe carrying the protocol data unit (note that the resource assignment may have changed between initial and retransmission). In this example, the resource allocation field has the same size as in the control channel format for scheduling mode 2. As the transport block size of the retransmission may be assumed identical to same for the initial transmission this information may be encoded and obtained from the subsequent control channel field providing information on the initial transmission.

Further, the control channel signal comprises the before mentioned field providing information on the initial transmission (which is corresponding to the TF/RV/NDI field of the format for scheduling mode 2 in its position in the control channel signal and the field size). This field may for example be used to indicate the transport format (transport block size) and redundancy version of the initial transmission. For scheduling mode 1 no NDI is required, as the control channel signal is only sent for retransmissions. Therefore, in comparison to the format for scheduling mode 2, the entire field can be used for control information on the initial transmission. The control information on the transport format and the redundancy version may be jointly encoded in the control channel field providing information on the initial transmission. Alternatively, the control channel field providing information on the initial transmission may be divided into separate sub-fields for the transport format and the redundancy version. Alternatively, the control channel field providing information on the initial transmission may only contain the transport format and a redundancy version may not be required.

For scheduling mode 1, the code point "111" is set in the HARQ process field to indicate on the one hand the HARQ process number of the protocol data unit and on the other hand scheduling mode 1 being used for the transmission of the protocol data unit.

For scheduling mode 2, the HARQ process field indicates the appropriate HARQ process number and thus implicitly indicates scheduling mode 2 being used for the transmission of the protocol data unit and the corresponding control channel format.

Figure 6:
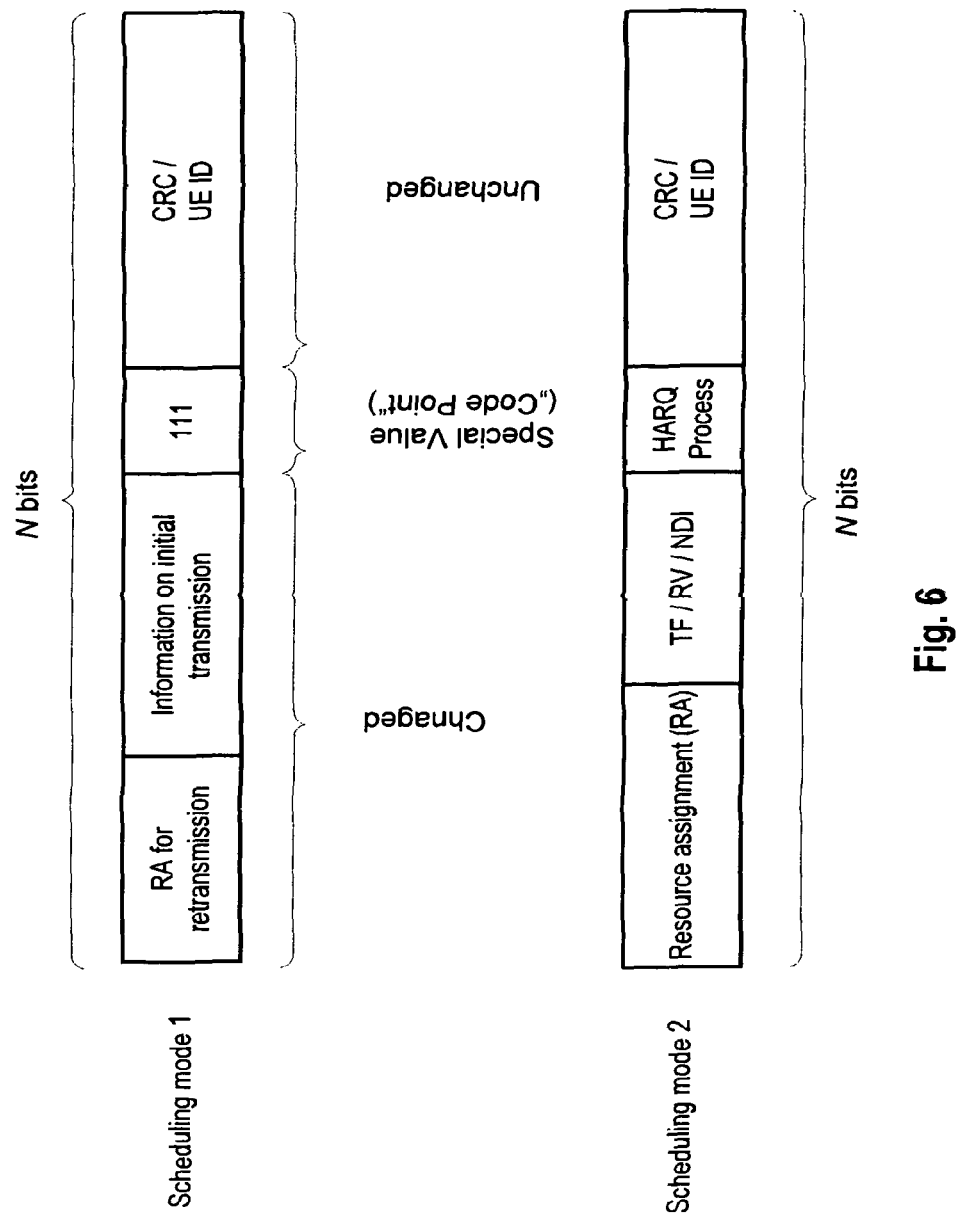
FIG. 6 shows another exemplary L1/L2 control channel signal according to one embodiment of the invention in which a HARQ filed is used to indicate a scheduling mode, and in which the use of the resource assignment (RA) field and the TF/RV/NDI field in the control channel signal is depending on the scheduling mode.

In an alternative embodiment of the invention, the size and position of some fields (except for the field(s) defining the code point(s)) in the control channel format may differ for the different scheduling modes. This is exemplified in FIG. 6 showing another exemplary L1/L2 control channel signal according to one embodiment of the invention in which a HARQ filed is used to indicate a scheduling mode, and in which the use of the resource assignment (RA) field and the TF/RV/NDI field in the control channel signal is depending on the scheduling mode. Essentially, the formats of the control channel for scheduling modes 1 and 2 in terms of the fields contained in the control channel signal corresponds to the examples shown in FIG. 5. However, the size of the resource assignment field is changed for scheduling mode 1 in comparison to the format of scheduling mode 2. The same is true for size and use of the TF/RV/NDI field(s) in the scheduling mode 2 control channel format.

In the example shown in FIG. 6, the resource assignment field for scheduling mode 1 is smaller than the corresponding field for scheduling mode 2. This design is based on the assumption that for scheduling mode 1 not all possible resource assignments (as for scheduling mode 2) are needed to the retransmission of scheduling mode 1, since e.g., only relatively small allocations are used for scheduling mode 1 or since a reduced number of different allocations with the same allocation size are sufficient. Accordingly, more control information bits may be assigned to the field indicating the control channel information for the initial transmission of the protocol data unit.

In another embodiment, another field than the HARQ process field of the control channel signal is used to define a code point. For example, the control channel signal may comprise a separate field indicating the transport format of the protocol data unit (TF field). According to this embodiment, a single value representable by the bits of the TF field is reserved as a code point to indicate the use of scheduling mode 1 for the transmission of the protocol data unit. Further, in a variation of this embodiment, the RV/NDI field may be used in the control channel signal to jointly encode the redundancy version and the new data indicator for the protocol data unit.

In another embodiment multiple TF "code points" may be reserved, as exemplarily shown in Table 3 below. Assuming that the number of required transport formats (e.g., Transport Block Sizes or MCS levels) for scheduling mode 1 is limited, this allows for determining the TBS or MCS level from the (pre-)configured candidates with a relatively small loss of TF values for scheduling mode 2. For example, if the TF field has 6 bits and 8 TBS values are preconfigured for scheduling mode 2, only 8 out of 64 TF values are "lost" for scheduling mode 1. In addition, the signaling of one of these "code points" could indicate the change of usage of all or part of the remaining control channel fields as described above.

TABLE 3

| Signaled Value (binary) | Signaled Value (decimal) | TF (TBS) | Ranges |
|---|---|---|---|
| 0000 | 0 | 50 | Scheduling mode 2 |
| 0001 | 1 | 100 | |
| 0010 | 2 | 150 | |
| 0011 | 3 | 230 | |
| 0100 | 4 | 300 | |
| 0101 | 5 | . . . | |
| 0110 | 6 | . . . | |
| 0111 | 7 | 500 | |
| 1000 | 8 | . . . | |
| 1001 | 9 | . . . | |
| 1010 | 10 | . . . | |
| 1011 | 11 | . . . | |
| 1100 | 12 | 1000 | |
| 1101 | 13 | Pre-config. TBS 1 | Scheduling mode 1 |
| 1110 | 14 | Pre-config. TBS 2 | |
| 1111 | 15 | Pre-config. TBS 3 | |

Also in case the transport format is jointly encoded with the redundancy version of the protocol data unit as described in European patent application no. EP 07024829.9 a code point may be defines in the joint field as shown in Table 4. In a similar fashion as exemplified in Table 4, also multiple code points could be defined.

TABLE 4

| Signaled Value (binary) | Signaled Value (decimal) | TF (TBS) | RV | Ranges | Scheduling mode |
|---|---|---|---|---|---|
| 0000 | 0 | . . . | 0 | TF range | Scheduling mode 2 |
| 0001 | 1 | . . . | 0 | | |
| 0010 | 2 | . . . | 0 | | |
| 0011 | 3 | . . . | 0 | | |
| 0100 | 4 | . . . | 0 | | |
| 0101 | 5 | 100 | 0 | | |
| 0110 | 6 | 120 | 0 | | |
| 0111 | 7 | 150 | 0 | | |
| 1000 | 8 | 200 | 0 | | |
| 1001 | 9 | . . . | 0 | | |
| 1010 | 10 | . . . | 0 | | |
| 1011 | 11 | . . . | 0 | | |
| 1100 | 12 | N/A | 0 | RV range | |
| 1101 | 13 | | 1 | | |
| 1110 | 14 | | 2 | | |
| 1111 | 15 | Pre-config. TBS 1 | 0 | Code point | Scheduling mode 1 |

As a further alternative embodiment of the invention, the resource assignment field of the control channel signal could be used for defining one or more code points in a similar fashion as described above. In a variation of this embodiment, the resource assignment field has a header as specified in 3GPP RAN WG1 Meeting #51 Tdoc.R1-074582, "Downlink Resource Allocation Mapping for E-UTRA", available at http://www.3gpp.org and incorporated herein by reference, and a specific bit combination(s) of the header bits in the resource allocation field may be defined as a code point(s).

Similarly, in a further embodiment the L1/L2 control channel signal comprises a separate RV field for indicating the redundancy version and the RV field is used to define at least one code point.

In a further alternative embodiment of the invention, the control channel (in scheduling mode 2) may have a field carrying power control commands for the associated downlink data transmission (on the PDSCH), for the PUCCH or for some other channel. To indicate scheduling mode 1 a code point of this field may be used, since for scheduling mode 1 this field is less important or not required.

In addition to the different approaches for defining code points in a single field of the control channel signal, individual code points may be defined in respective fields could be reserved to indicate scheduling mode 1. In an exemplary embodiment of the invention, a combination of the values of the resource assignment field and the TF field may define one or more code points. In this exemplary embodiment, the resource assignment and transport format candidates of the blind detection (in the first transmission) can be reduced, e.g., the "code points" in the in the TF field are used to indicate the preconfigured TBSs as shown in Table 3 and a similar scheme for reducing the resource allocation candidates can be used in the resource allocation field. In addition, the signaling of these "code points" could indicate the change of the usage of part of the remaining control channel fields as described above.

Examples of mobile communication systems in which the principles of the invention outlined herein may be utilized are communication systems utilizing an OFDM scheme, a MC-CDMA scheme or an OFDM scheme with pulse shaping (OFDM/OQAM).

Furthermore, it should also be noted that though most embodiments of the invention have been described with respect to subframes of a (shared) downlink physical channel which comprise the user data transmission and the associated control channel signal for the user data transmission, also other designs are possible in which control channel information of a user data transmission is sent in an earlier subframe of the (shared) downlink physical channel than that containing the user data transmission, or where there is a separate physical control channel for the signaling of the control channel information.

Furthermore, the (shared) downlink physical channel mentioned herein may be for example a Downlink Shared CHannel (PDSCH) of a 3GPP LTE system.

Another embodiment of the invention relates to the implementation of the above described various embodiments using hardware and software. It is recognized that the various embodiments of the invention may be implemented or performed using computing devices (processors). A computing device or processor may for example be general purpose processors, digital signal processors (DSP), application specific integrated circuits (ASIC), field programmable gate arrays (FPGA) or other programmable logic devices, etc. The various embodiments of the invention may also be performed or embodied by a combination of these devices.

Further, the various embodiments of the invention may also be implemented by means of software modules, which are executed by a processor or directly in hardware. Also a combination of software modules and a hardware implementation may be possible. The software modules may be stored on any kind of computer readable storage media, for example RAM, EPROM, EEPROM, flash memory, registers, hard disks, CD-ROM, DVD, etc.

Furthermore, it should be noted that the terms mobile terminal and mobile station are used as synonyms herein. A user equipment may be considered one example for a mobile station and refers to a mobile terminal for use in 3GPP-based networks, such as LTE.

In the previous paragraphs various embodiments of the invention and variations thereof have been described. It would be appreciated by a person skilled in the art that numerous variations and/or modifications may be made to the present invention as shown in the specific embodiments without departing from the spirit or scope of the invention as broadly described.

It should be further noted that most of the embodiments have been outlined in relation to a 3GPP-based communication system and the terminology used in the previous sections mainly relates to the 3GPP terminology. However, the terminology and the description of the various embodiments with respect to 3GPP-based architectures is not intended to limit the principles and ideas of the inventions to such systems.

Also the detailed explanations given in the Technical Background section above are intended to better understand the mostly 3GPP specific exemplary embodiments described herein and should not be understood as limiting the invention to the described specific implementations of processes and functions in the mobile communication network. Nevertheless, the improvements proposed herein may be readily applied in the architectures described in the Technical Background section. Furthermore, the concept of the invention may be also readily used in the LTE RAN currently discussed by the 3GPP.

The invention claimed is:

1. An integrated circuit configured to control operation of a base station, the integrated circuit embodying logic operable to:
   transmit, to a mobile station, a control channel signal that includes a HARQ (Hybrid Automatic Repeat request) process field and other control information format fields; and
   support a dynamic scheduling mode or a persistent scheduling mode in communicating with the mobile station, wherein,
   when a value in the HARQ process field and a value in another control information format field in the transmitted control channel signal at least partially constitute a predetermined combination of values, the logic supports the persistent scheduling mode in communicating with the mobile station, and
   interpretation of at least one control information format field, which is other than the HARQ field and the another control information format field, is different between the dynamic scheduling mode and the persistent scheduling mode, wherein the interpretation is based on the predetermined combination of values.

2. The integrated circuit according to claim 1, wherein the number of bits of the control channel signal is equal between the dynamic and persistent scheduling modes.

3. The integrated circuit according to claim 1, wherein the number of resource allocation variations is less in the persistent scheduling mode than in the dynamic scheduling mode.

4. The integrated circuit according to claim 1, wherein the HARQ process field and the another control information format field are located at fixed positions within the control channel signal in all control information formats.

5. The integrated circuit according to claim 1, wherein the value in the HARQ process field is a value represented by at least a portion of bits in the HARQ process field.

6. The integrated circuit according to claim 1, wherein the another control information format field is an RV (redundancy version) field.

7. An integrated circuit configured to control operation of a base station, the integrated circuit comprising:
   transmission circuitry, which, in operation, controls transmitting, to a mobile station, a control channel signal that includes a HARQ (Hybrid Automatic Repeat request) process field and other control information format fields; and
   control circuitry, which is coupled to the transmission circuitry and which, in operation, supports a dynamic scheduling mode or a persistent scheduling mode in communicating with the mobile station, wherein,
when a value in the HARQ process field and a value in another control information format field in the transmitted control channel signal at least partially constitute a predetermined combination of values, the control circuitry supports the persistent scheduling mode in communicating with the mobile station, and
interpretation of at least one control information format field, which is other than the HARQ field and the another control information format field, is different between the dynamic scheduling mode and the persistent scheduling mode, wherein the interpretation is based on the predetermined combination of values.

8. The integrated circuit according to claim 7, wherein the number of bits of the control channel signal is equal between the dynamic and persistent scheduling modes.

9. The integrated circuit according to claim 7, wherein the number of resource allocation variations is less in the persistent scheduling mode than in the dynamic scheduling mode.

10. The integrated circuit according to claim 7, wherein the HARQ process field and the another control information format field are located at fixed positions within the control channel signal in all control information formats.

11. The integrated circuit according to claim 7, wherein the value in the HARQ process field is a value represented by at least a portion of bits in the HARQ process field.

12. The integrated circuit according to claim 7, wherein the another control information format field is an RV (redundancy version) field.

* * * * *